(12) United States Patent
Taguchi

(10) Patent No.: US 9,380,203 B2
(45) Date of Patent: Jun. 28, 2016

(54) FOCUSING DEVICE, CAMERA SYSTEM AND FOCUSING METHOD

(71) Applicant: Olympus Corporation, Shibuya-ku, Tokyo (JP)

(72) Inventor: Yuzuru Taguchi, Hachioji (JP)

(73) Assignee: Olympus Corporation, Tokyo (JP)

( * ) Notice: Subject to any disclaimer, the term of this patent is extended or adjusted under 35 U.S.C. 154(b) by 0 days.

(21) Appl. No.: 14/644,868

(22) Filed: Mar. 11, 2015

(65) Prior Publication Data

US 2015/0189159 A1 Jul. 2, 2015

Related U.S. Application Data

(63) Continuation of application No. PCT/JP2013/074770, filed on Sep. 12, 2013.

(30) Foreign Application Priority Data

Sep. 14, 2012 (JP) .................................. 2012-203606

(51) Int. Cl.
*H04N 5/232* (2006.01)
*G02B 7/38* (2006.01)
(Continued)

(52) U.S. Cl.
CPC .............. *H04N 5/23212* (2013.01); *G02B 7/38* (2013.01); *G03B 3/10* (2013.01); *G03B 13/36* (2013.01); *H04N 5/23209* (2013.01)

(58) Field of Classification Search
CPC ............................ H04N 5/23212; G02B 7/38
See application file for complete search history.

(56) References Cited

U.S. PATENT DOCUMENTS

2011/0206359 A1* 8/2011 Nishimura ............... G03B 3/10
396/111
2012/0057069 A1 3/2012 Yamasaki
2012/0262595 A1* 10/2012 Kishida ................... G02B 7/08
348/220.1

FOREIGN PATENT DOCUMENTS

JP 2005-221798 8/2005
JP 2008-046181 2/2008
(Continued)

OTHER PUBLICATIONS

English Translation of the International Preliminary Report on Patentability PCT/IB/373 (1 pg.) including Notification of Transmittal PCT/IB/338 (1 pg.) and Written Opinion of the International Searching Authority PCT/ISA/237 (5 pgs.) to International Application No. PCT/JP2013/074770, mailed on Mar. 26, 2015 (7 pgs.).

(Continued)

*Primary Examiner* — Ahmed A Berhan
(74) *Attorney, Agent, or Firm* — John C. Pokotylo; Straub & Pokotylo

(57) ABSTRACT

A focusing device includes an imaging element, an imaging lens, a focus evaluation value detecting section, a control section. The imaging lens includes focus lens groups including first and second focus lens groups, and the imaging element to enable focus adjustment. The focus evaluation value detecting section detects a focus evaluation value based on an image signal acquired by the imaging element. The control section moves focus lens groups based on the focus evaluation value, effects a wobbling operation of the first focus lens group to focus on the subject, and moves the second focus lens group while effecting the wobbling operation of the first lens group for one period alone, so that image surface positions of the focus lens groups are moved by predetermined amounts.

18 Claims, 17 Drawing Sheets

(51) Int. Cl.
*G03B 3/10* (2006.01)
*G03B 13/36* (2006.01)

(56) References Cited

FOREIGN PATENT DOCUMENTS

| JP | 2010-170051 | 8/2010 |
| JP | 2012-027262 | 2/2012 |
| WO | WO 2011/048752 | 4/2011 |
| WO | WO 2012/081142 | 6/2012 |

OTHER PUBLICATIONS

International Search Report to PCT/JP2013/074770 (3pgs.), with translation (2 pgs.).
Supplementary European Search Report to European Application No. 13837270.1, mailed on Mar. 31, 2016 (8 pgs).

* cited by examiner

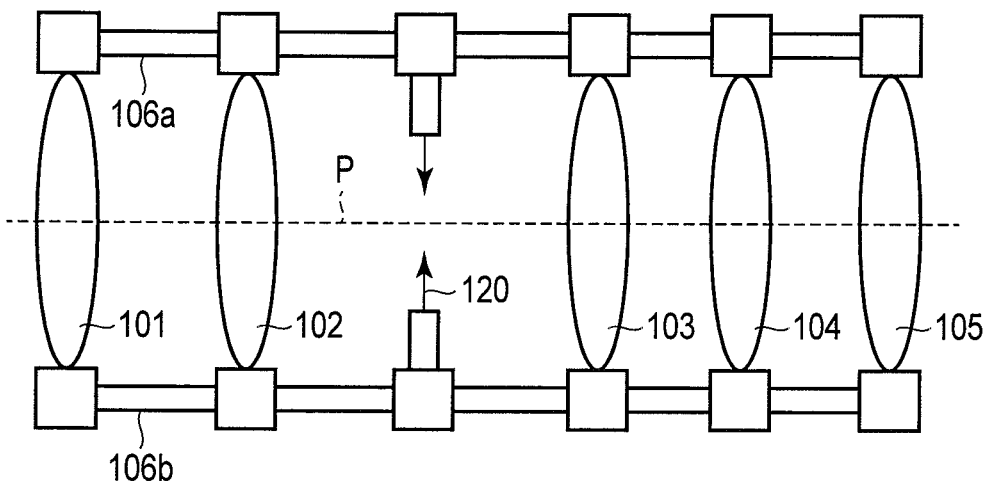
F I G. 3
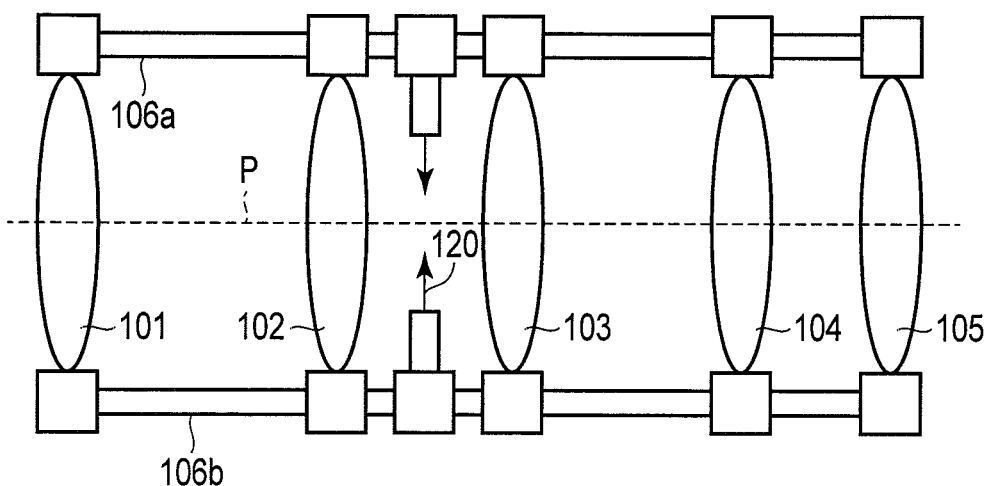
F I G. 4

| 3G motor position [pls] | Magnification |
|---|---|
| 0 | 1.5 |
| 100 | 1.6 |
| 200 | 1.65 |
| ... | ... |
| 16000 | 3.1 |
| 17000 | 3 |

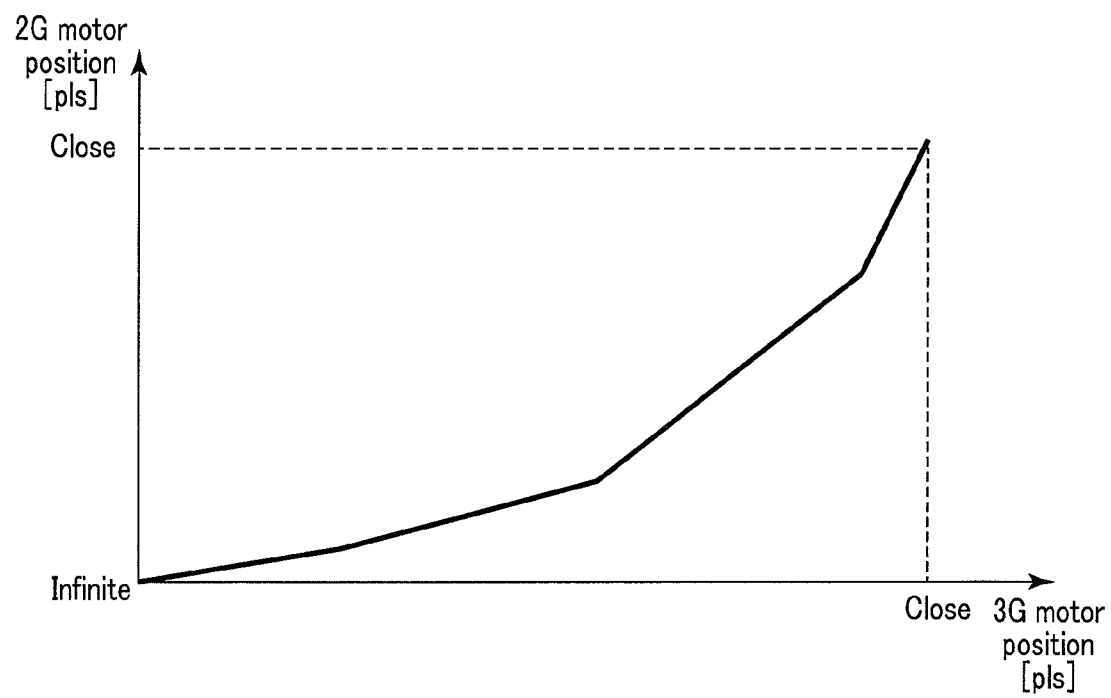
F I G. 9

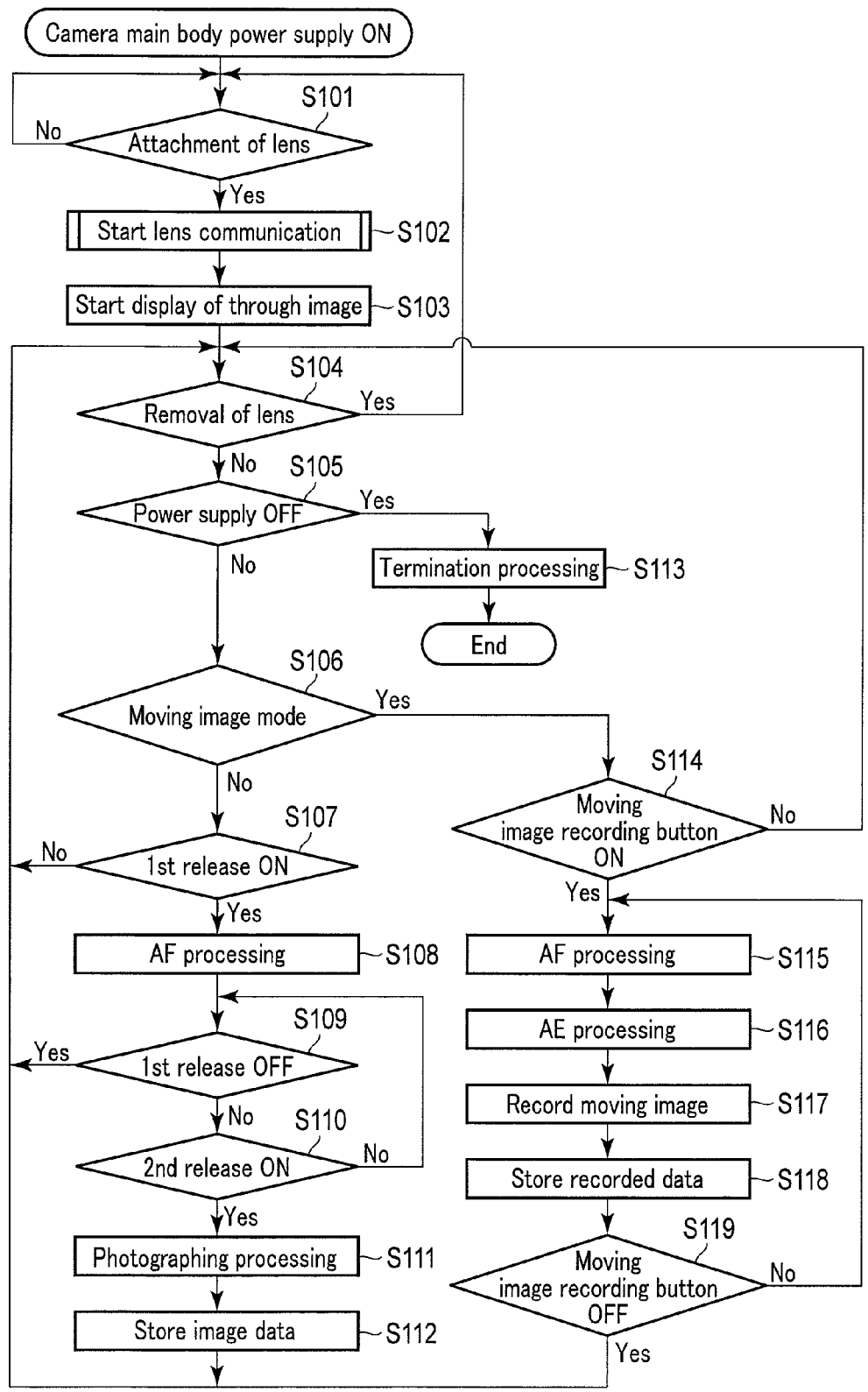
F I G. 10

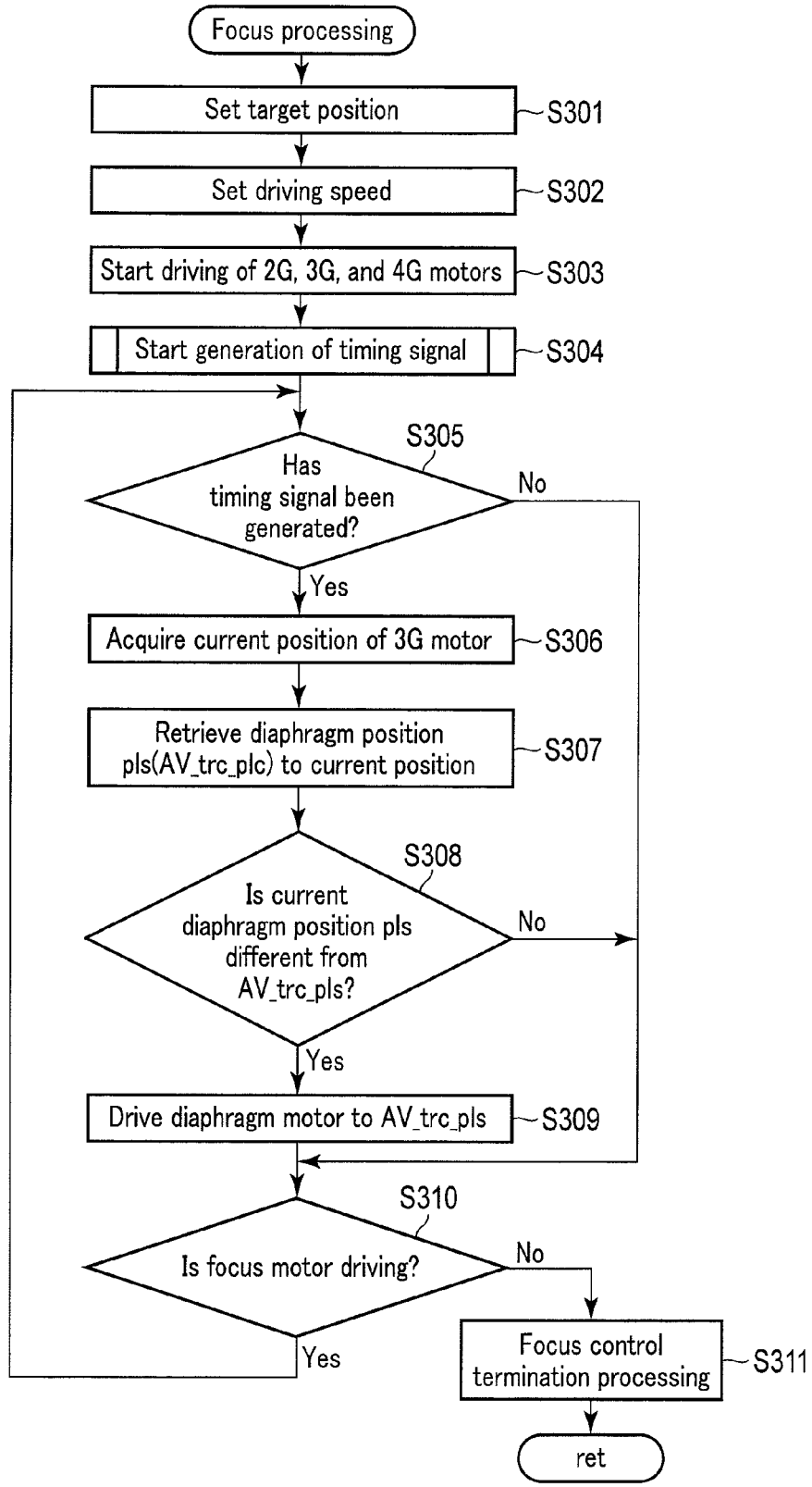
F I G. 12

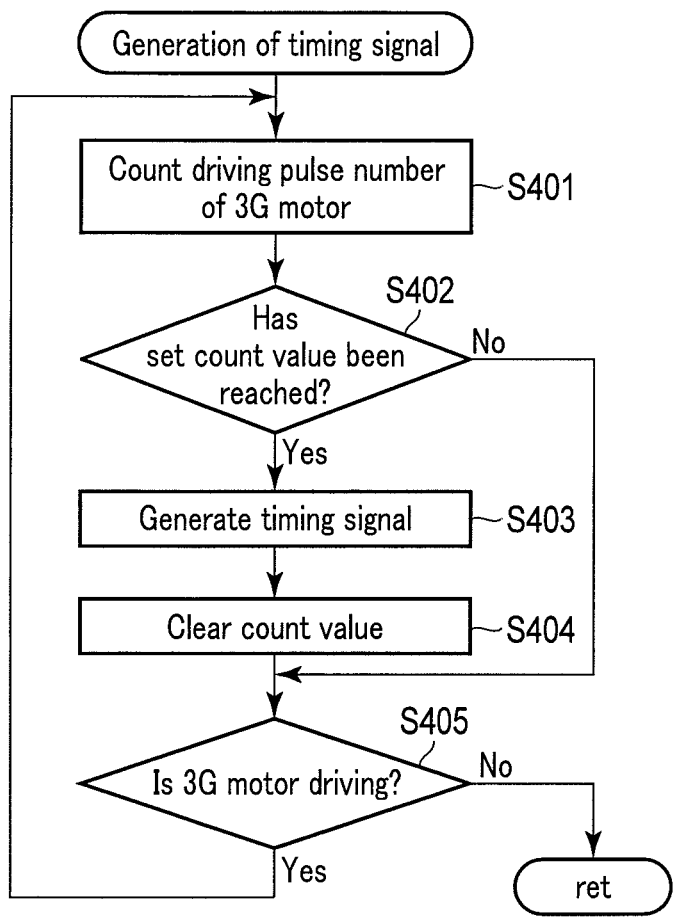
F I G. 13

FOCUSING DEVICE, CAMERA SYSTEM AND FOCUSING METHOD

CROSS-REFERENCE TO RELATED APPLICATIONS

This application is a Continuation Application of PCT Application No. PCT/JP2013/074770, filed Sep. 12, 2013 and based upon and claiming the benefit of priority from prior Japanese Patent Application No. 2012-203606, Sep. 14, 2012, the entire contents of all of which are incorporated herein by reference.

BACKGROUND OF THE INVENTION

1. Field of the Invention

The present invention relates to a focusing device, a camera system and a focusing method that effect a wobbling operation of a first focus lens group in focus lens groups to bring a subject into focus (autofocus: AF).

2. Description of the Related Art

As a prior art of focusing, a method is known which comprises effecting a wobbling operation (micro-vibration) of a lens in an optical axis direction to detect a focus evaluation value, and detecting a focus deviation direction based on a change in the focus evaluation value at this moment. For example, Jpn. Pat. Appln. KOKAI Publication No. 2005-221798 discloses an autofocus system that includes a wobbling lens group and a focus adjustment lens group and individually moves these lens groups.

In Jpn. Pat. Appln. KOKAI Publication No. 2005-221798 mentioned above, the wobbling lens group is wobbled to detect a focusing direction, the focus adjustment lens group is moved in this detected focusing direction, and then the wobbling lens group is again wobbled to determine whether focusing is achieved. If a result of this determination is nonfocusing, the focus adjustment lens is again moved in the focusing direction detected by the wobbling. The above-described operation is repeatedly performed until the focusing is achieved.

BRIEF SUMMARY OF THE INVENTION

An imaging apparatus according to aspect of the present invention comprises an imaging element which includes an imaging plane, an imaging lens which includes focus lens groups, which includes first and second focus lens groups, and forms an image of a subject on the imaging plane of the imaging element to enable focus adjustment, a focus evaluation value detecting section which detects a focus evaluation value based on an image signal acquired by imaging of the imaging element, and a control section which moves the focus lens groups based on the focus evaluation value, effects a wobbling operation of the first focus lens group to focus on the subject, and moves the second focus lens group while effecting the wobbling operation of the first lens group for one period alone so that image surface positions of the focus lens groups are moved by predetermined amounts, wherein the control section offsets a center position of an amplitude of the wobbling operation of the first focus lens group by a first amount in a moving direction of the second focus lens group and adds a second amount to the amplitude of the wobbling operation while moving the second focus lens group.

A camera system according to aspect of the present invention comprises an interchangeable lens including a photographing lens having focus lens groups including first and second lens groups, and a camera main body to/from which the interchangeable lens is attachable/detachable and which includes an imaging element, wherein the camera main body includes, a focus evaluation value detecting section which detects a focus evaluation value based on an image signal obtained by imaging of the imaging element, and a main body control section which communicates with the interchangeable lens and instructs on a focusing operation to focus on the subject based on the focus evaluation value, the interchangeable lens includes, a focus lens driving section which separately drives the focus lens groups; and a lens control section which communicates with the main body control section to move the focus lens groups, and controls the focus lens driving section to effect a wobbling operation of the first focus lens group, and the lens control section moves the second focus lens group to move image surface positions of the focus lens groups by predetermined amounts while effecting the wobbling operation of the first lens group for one period alone, and offsets a center position of an amplitude of the wobbling operation of the first focus lens group by a first amount in a moving direction of the second focus lens group and adds a second amount to the amplitude of the wobbling operation while moving the second focus lens group.

A focusing method according to aspect of the present invention comprises forming an image of a subject on an imaging plane of an imaging element through focus lens groups including first and second focus lens groups, detecting a focus evaluation value based on an image signal acquired by imaging of the imaging element, moving the focus lens groups based on the focus evaluation value, and effecting a wobbling operation of the first focus lens group to focus on the subject, moving the second focus lens group while effecting the wobbling operation of the first focus lens group for one period only, so that image surface positions of the focus lens groups are moved by predetermined amounts, offsetting a center position of an amplitude of the wobbling operation of the first focus lens by a first amount in a moving direction of the second focus lens group while moving the second focus lens group, and adding a second amount to the amplitude of the wobbling operation.

Additional advantages of the invention will be set forth in the description which follows, and in part will be obvious from the description, or may be learned by practice of the invention. The advantages of the invention may be realized and obtained by means of the instrumentalities and combinations particularly pointed out hereinafter.

BRIEF DESCRIPTION OF THE SEVERAL VIEWS OF THE DRAWING

The accompanying drawings, which are incorporated in and constitute a part of the specification, illustrate embodiments of the invention, and together with the general description given above and the detailed description of the embodiments given below, serve to explain the principles of the invention.

FIG. 3 is a view showing the respective lens positions of the second to fourth lens groups when a focus position is infinite in the device;

FIG. 4 is a view showing the respective lens positions of the second to fourth lens groups when the focus position is very close in the device;

FIG. 9 is a view showing a relationship between positions of the stepping motor for the second group and positions of the stepping motor for the third group in the device;

FIG. 10 is a flowchart of camera main body power supply ON in the device;

FIG. 12 is a flowchart of focus processing in the device;

FIG. 13 is a flowchart of timing signal generation in the device;

DETAILED DESCRIPTION OF THE INVENTION

Hereinafter, an embodiment of the present invention will be described with reference to the drawings.

Figure 1:
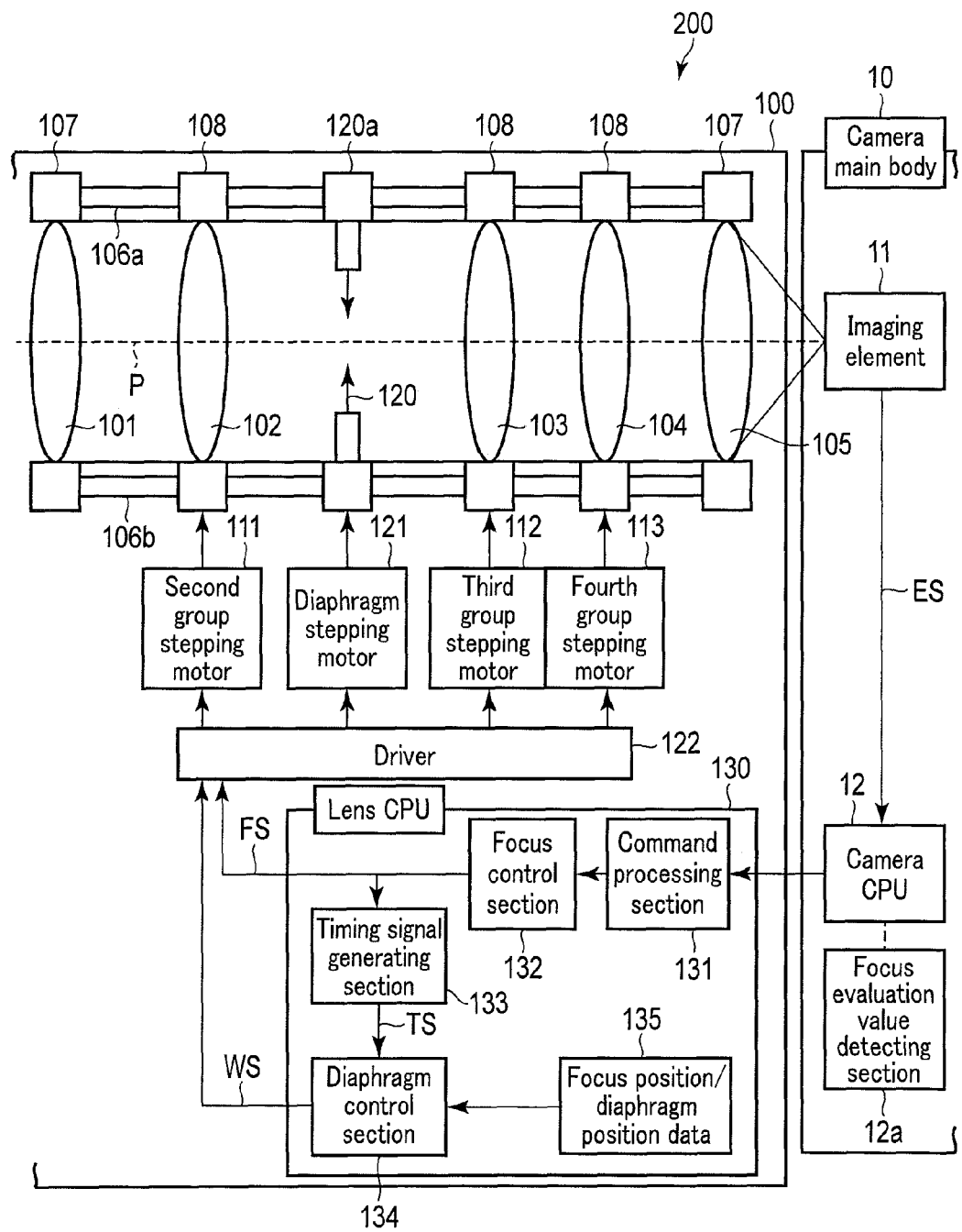
FIG. 1 is a block diagram showing a focusing device using an embodiment of an imaging apparatus according to the present invention.

FIG. 1 shows a block diagram of an imaging apparatus (which will be referred to as the apparatus 200 hereinafter) using a focusing device. The apparatus 200 includes an interchangeable lens type configuration, and an interchangeable lens section 100 is interchangeably disposed to a camera main body 10. The apparatus 200 is not restricted to an interchangeable lens type camera and can be likewise applied to, e.g., a compact camera or a portable device having an imaging function.

The camera main body 10 converts a subject image formed through the interchangeable lens section 100 into an electrical signal and image-processes the electrical signal, thereby acquiring image data of a still image or a moving image. The camera main body 10 includes an imaging element 11 and a camera CPU 12.

The imaging element 11 converts a subject image formed through the interchangeable lens section 100 into an electrical signal ES.

On acquiring a still image or a moving image, the camera CPU 12 executes contrast AF processing or AE processing, and also image-processes the electrical signal ES output from the imaging element 11 to acquire image data of a still image or a moving image. The camera CPU 12 performs, as image-processing, e.g., color correction processing, gamma (γ) correction processing, compression processing, expansion processing for image data compressed by the compression processing, and others.

In the contrast AF processing, a high-frequency component of image data acquired by imaging of the imaging element 11 is extracted, and the extracted high-frequency component is integrated, thereby obtaining a focus evaluation value for AF. In the contrast AF processing, focus lens groups in a lens system of the interchangeable lens section 100, which are a second lens group 102, a third lens group 103, and a fourth lens group 104 in this example, are adjusted to positions where focused states are provided while evaluating a contrast of the image data in accordance with the obtained focus evaluation value.

In the AE processing, a luminance of the subject is calculated using the image data acquired by imaging of the imaging element 11, and an opening amount (an aperture value) of a diaphragm unit 120 and an opening time of a shutter (a shutter speed value) at the time of exposure are calculated in accordance with the luminance of the subject.

The camera main body 10 includes an operating section provided with a display that shows moving images or moving images, a release button, a mode switch, a moving image recording button, a selection key, a power supply button, and others, but they will be omitted here.

The interchangeable lens section 100 includes first to fifth lens groups 101 to 105 as an imaging lens system. Each of the first to fifth lens groups (1G to 5G lens groups) 101 to 105 is formed of a combination of optical lenses. The first to fifth lens groups 101 to 105 form an image of the subject on an imaging plane of the imaging element 11, whereby the subject is made focus-adjustable. The fourth lens group 104 is provided exclusively for a wobbling operation at the time of focusing as a first focus lens group. The second and third lens groups 102 and 103 are used for focusing (for focus adjustment) as second focus lens groups. The fourth lens group 104 is set to a lower magnification than those of the other first to third and fifth lens groups 101 to 103 and 105.

The first and fifth lens groups 101 and 105 are fixed to a main body of the interchangeable lens section 100. The second to fourth lens groups 102 to 104 are provided to the main body of the interchangeable lens section 100 to be movable in an optical axis direction P.

Specifically, for example, two suspension shafts 106a and 106b are provided to the interchangeable lens section 100 to be parallel to each other. The first and fifth lens groups 101 and 105 are fixed to the respective suspension shafts 106a and 106b through respective fixing members 107. The second to fourth lens groups 102 to 104 are provided to be movable to the suspension shafts 106a and 106b via moving mechanisms 108, respectively. The moving mechanisms 108 enable movement of the second to fourth lens groups 102 to 104 respectively in the optical axis direction P.

Figure 2:
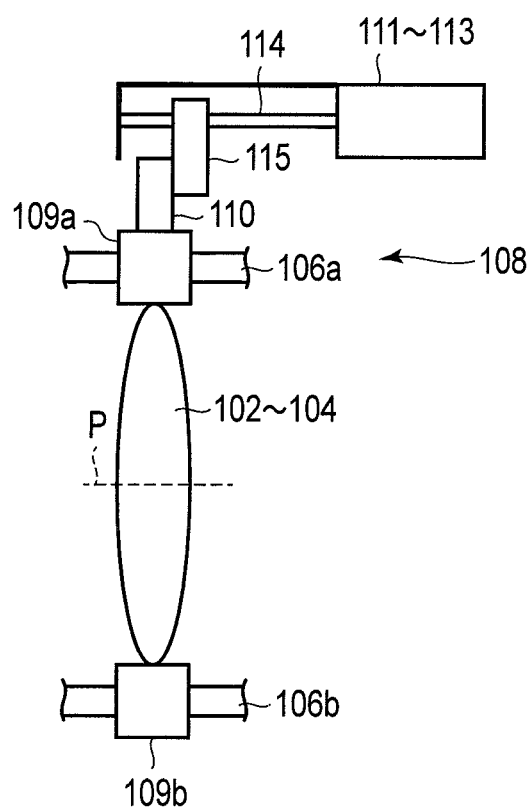
FIG. 2 is a block diagram showing a moving mechanism for second to fourth lens groups in the device.

FIG. 2 shows a block diagram of the moving mechanism 108 for each of the second to fourth lens groups 102 to 104. The moving mechanism 108 includes sliding members 109a and 109b that slide on the suspension shafts 106a and 106b, respectively. The second to fourth lens groups 102 to 104 are supported on the sliding members 109a and 109b. A coupling member 110 is provided on, e.g., the sliding member 109a of the respective sliding members 109a and 109b.

In the moving mechanism 108, stepping motors (2G to 4G motors) 111 to 113 for the second to fourth groups are provided to the second to fourth lens groups 102 to 104, respectively. Each of the stepping motors 111 to 113 for the second to fourth groups is provided with a screw shaft 114 to be parallel to the optical axis P. To the screw shaft 114, a sliding nut member 115 is screwed. To the sliding nut member 115, the coupling member 110 is coupled.

If the stepping motors 111 to 113 for the second to fourth groups drive, each of the screw shafts 114 rotates. The rotation of each screw shaft 114 allows the sliding nut member 115 to slide on the screw shaft 114 in a direction parallel to the optical axis P. Since the sliding of the sliding nut member 115 is transmitted to the sliding member 109a through the coupling member 110, each of the second to fourth lens groups 102 to 104 moves along the respective suspension shafts 106a and 106b via the respective sliding members 109a and 109b.

The diaphragm unit 120 is provided between the second and third lens groups 102 and 103. The diaphragm unit 120 is fixed to a support member 120a that supports on the respective suspension shafts 106a and 106b. The diaphragm unit 120 is provided with a diaphragm stepping motor 121. The diaphragm stepping motor 121 drives the diaphragm unit 120 to change an opening amount.

The stepping motors 111 to 113 for the second to fourth groups and the diaphragm stepping motor 121 are connected to a lens CPU 130 through a driver 122, respectively.

If the lens CPU 130 receives a command from the camera CPU 12, it supplies, e.g., a focus control signal FS and a diaphragm control signal WS to the driver 122 to execute focus processing or the like according to the command. In response to the supply of the focus control signal FS, the second to fourth stepping motors 111 to 113 drive, respectively. The driving of the second to fourth stepping motors 111 to 113 brings about controlling the second to fourth lens groups 102 to 104 to respective lens positions where focusing is achieved. In response to the supply of the diaphragm signal WS, the diaphragm stepping motor 121 drives. The driving of the diaphragm stepping motor 121 brings about controlling an opening amount of the diaphragm unit 103. The focus control signal FS includes information of respective lens positions of the second to fourth lens groups 102 to 104. The diaphragm control signal WS includes information of the opening amount and others of the diaphragm unit 103. The focus control signal FS includes respective focus control signals of the stepping motors 111 to 113 for the second to fourth groups.

FIG. 3 shows respective lens positions of the second to fourth lens groups 102 to 104 when a focus position is infinite (Far). FIG. 4 shows respective lens positions of the second to fourth lens groups 102 to 104 when the focus position is close (Near). If the focus position is infinite, the respective lens positions of the second to third lens groups 102 and 103 are controlled so that the respective lens positions move away from the diaphragm unit 120. On the other hand, if the focus position is close, the respective lens positions of the second and third lens groups 102 and 103 are controlled so that the respective lens positions move closer to the diaphragm unit 120.

The lens CPU 130 includes respective functions of a command processing section 131, a focus control section 132, a timing signal generating section 133, and a diaphragm control section 134 to execute focus processing and others. To the lens CPU 130 is provided a focus/diaphragm memory section 135 that stores focus/diaphragm relevant data showing a relationship between a focus position and diaphragm position data.

Upon receiving a command from the camera CPU 12, the command processing section 131 outputs an instruction to the focus control section 132 based on the command. A control signal from the camera CPU 12 to the command processing section includes a synchronization signal as a timing signal in addition to a command.

To execute focus processing or the like corresponding to a command signal from the command processing section 131, the focus control section 132 supplies, e.g., a focus control signal FS to the driver 122.

The timing signal generating section 133 generates a timing signal TS based on the focus control signal. FS output from the focus control section 132.

The diaphragm control section 134 reads out focus/diaphragm relevant data stored in the focus/diaphragm memory section 135 in accordance with the timing signal TS generated by the timing signal generating section 133, and supplies a diaphragm control signal WS based on the focus/diaphragm relevant data to the driver 122.

Figures 5, 6:
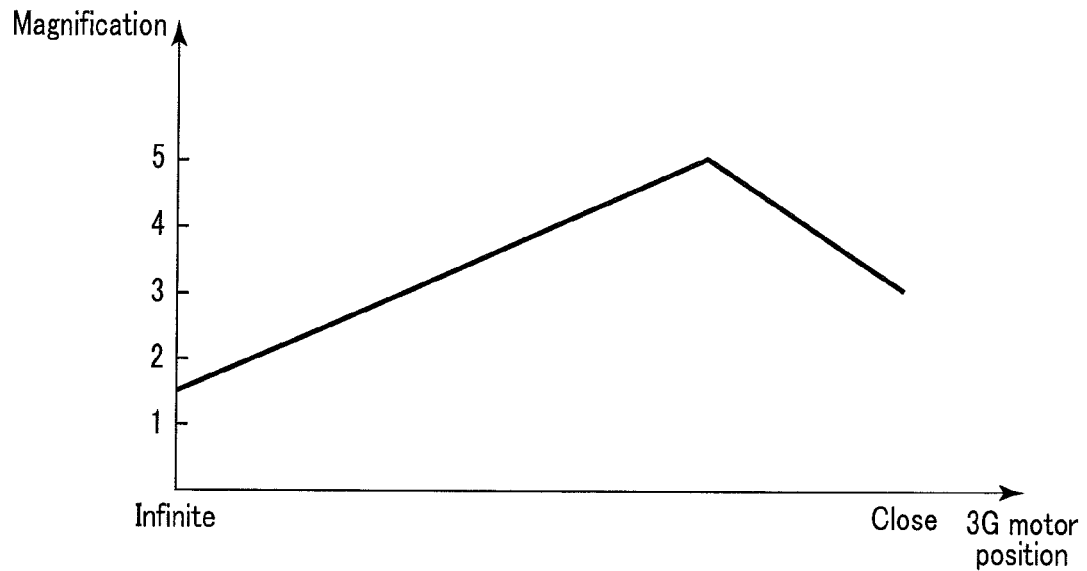
FIG. 5 is a view showing a relationship of speed magnifications of a second group stepping motor to distances of the stepping motor for a third group ranging from infinity to a close range distance in the device.
FIG. 6 is a view showing a relationship between positions and magnifications of the stepping motor for the third group in the device.

The focus/diaphragm relevant data includes, e.g., such a relationship of speed magnifications of the stepping motor 111 for the second group to infinite to close range distances of the stepping motor 112 for the third group as shown in FIG. 5. The relationship of the speed magnifications is stored as a relationship between control positions of the stepping motor 112 for the third group and magnifications shown in FIG. 6.

Figure 7:
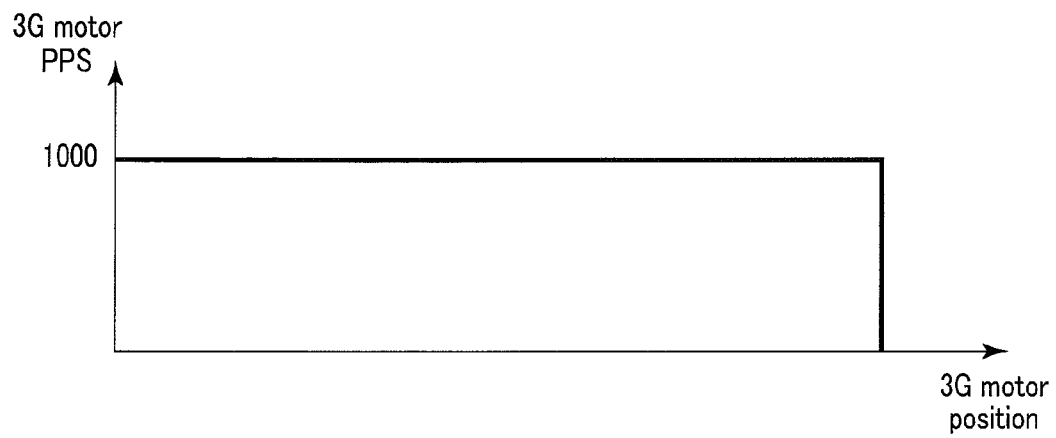
FIG. 7 is a view showing speeds of the stepping motor for the third group to positions of the stepping motor for the third group in the device.
Figure 8:
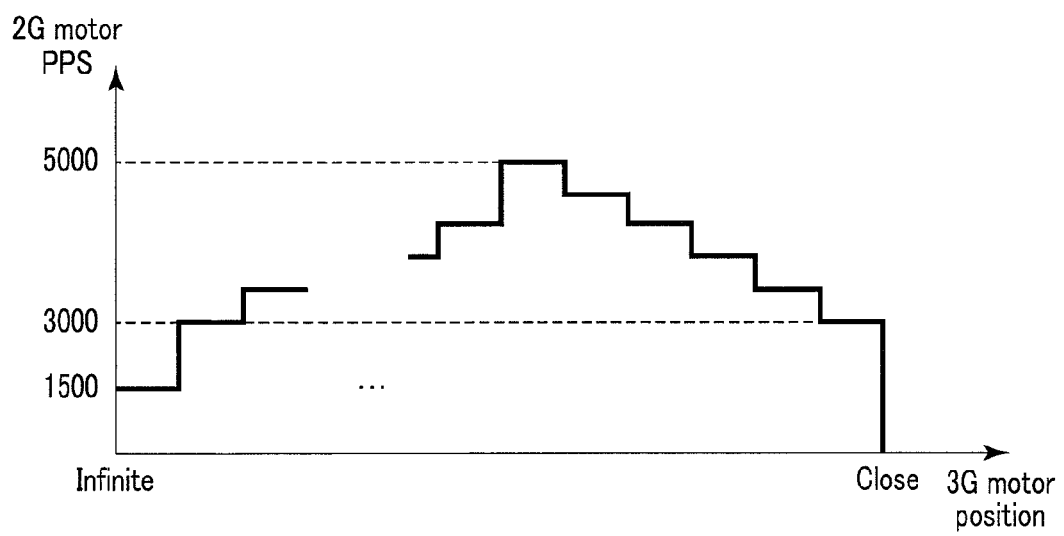
FIG. 8 is a view showing speeds of the stepping motor for the second group to positions of the stepping motor for the third group in the device.

As the focus/diaphragm relationship data, such data representing relationships between the stepping motors 111 and 112 for the second and third groups as shown in FIGS. 7 to 9 is stored. FIG. 7 shows speeds of the stepping motor 112 for the third group to positions of the stepping motor 112 for the third group. FIG. 8 shows speeds of the second stepping motor 111 to positions of the third stepping motor 112. FIG. 9 shows a relationship of positions (pulse numbers: pls) of the stepping motor 111 for the second group to positions (pulse numbers: pls) of the stepping motor 112 for the third group.

The camera CPU 12 includes a function of a focus evaluation value detecting section 12a. The focus evaluation value detecting section 12a acquires, e.g., contrast as a focus evaluation value based on image data obtained by imaging of the imaging element 11. The contrast is acquired by extracting a high-frequency component of the image data and integrating the extracted high-frequency component.

The camera CPU 12 issues to the lens CPU 130 commands such as an AF control instruction of a focus to drive the second to fourth lens groups 102 to 104 or a control instruction of a diaphragm to drive the diaphragm unit 120. The camera CPU 12 issues to the lens CPU 130 a command to perform a wobbling operation including an amplitude and a moving amount of the wobbling operation in AF.

The focus control section 132 of the lens CPU 130 moves the focus lens groups, which are the second and third lens groups 102 and 103 in this example, and brings about the wobbling operation of the fourth lens group 104, which is the first focus lens groups, based on an instruction from the command processing section 131 based on a command from the camera CPU 12, thereby focusing on a subject.

The focus control section 132 moves the second and third lens groups 102 and 103 by predetermined amounts respectively to move image surface positions of the focus lens groups 101 to 104 by predetermined image surface amount while effecting the wobbling operation of the fourth lens group for one period alone.

In the following description, operations of effecting the wobbling operation of the fourth lens group 104 and moving the second and third lens groups 102 and 103 will be generically called the wobbling operation.

The focus control section 132 offsets a center position of an amplitude of the wobbling operation of the fourth lens group 104 in a moving direction of the second and third lens groups 102 and 103 by a first amount (an offset value) while moving the second and third lens groups 102 and 103 as described above. The focus control section 132 determines the amplitude of the wobbling operation as an amplitude obtained by adding a second amount (an amplitude addition value).

Image surface sensitivities of the second and third lens groups 102 and 103 are set to be higher than image surface sensitivity of the fourth lens group 104.

The offset value is, e.g., ¼ of the moving amount of the wobbling operation. The amplitude addition value is, e.g., ¼ of the moving amount of the wobbling operation.

The focus control section 132 drives the second and third lens groups 102 and 103 at fixed speeds.

Specifically, when an amplitude and a moving amount of the wobbling operation are indicated from the camera CPU 12, the focus control section 132 obtains an offset that is ¼ of the moving amount of the wobbling operation and acquires an amplitude addition value that is ¼ of the moving amount of the wobbling operation.

If the amplitude and the moving amount of the wobbling operation are indicated from the camera CPU 12, the focus control section 132 moves each of the second and third lens groups 102 and 103 by the moving amount indicated from the camera CPU 12 every time the wobbling operation of the fourth lens group 104 is effected for one period alone.

An operation of the apparatus 200 configured as described above will now be explained hereinafter with reference to a flowchart of the camera main body power supply ON (ON) shown in FIG. 10.

At a step S101, the camera CPU 12 determines whether the interchangeable lens section 100 is disposed to the camera main body 10. The determination is made by confirming, e.g., mechanical connection between the camera main body 10 and the interchangeable lens section 100. The determination may be made through subsequent communication between the camera CPU 12 and the lens CPU 130 of the interchangeable lens section 100.

As a result of the determination, if the interchangeable lens section 100 is disposed to the camera main body 10, the camera CPU 12 communicates with the lens CPU 130 of the interchangeable lens section 100 to perform, e.g., initialization of respective lens positions of the first to fifth lens groups 101 to 105 at a step S102.

The camera CPU 12 displays a through image in the display at a step S103.

In the display of the through image, the camera CPU 12 communicates with the lens CPU 130 of the interchangeable lens section 100 to set a diaphragm of the diaphragm unit 120, starts imaging using the imaging element 11, sequentially stores image data of each frame acquired by the imaging of the imaging element 11, and executes image processing for live view display to the stored image data to be displayed in the display. When the image data display operation is repeated, the through image of the subject is displayed in the display.

At a step S104, the camera CPU 12 determines whether the interchangeable lens section 100 has been removed from the camera main body 10. If the interchangeable lens section 100 has been removed, the camera CPU 12 returns to the step S101.

At a step S105, the camera CPU 12 determines whether the power supply of the camera main body has been turned off (OFF). If a result of the determination is not the power supply OFF, the camera CPU 12 determines whether a moving image mode is being used at a step S106. If a result of the determination is not the moving image mode, the camera CPU 12 recognizes that a still image mode is being used and determines whether a release button has been half-depressed (1st: ON) at a step S107. As a result of the determination, if the release button has been half-depressed, the camera CPU 12 executes the AF processing to the subject at a step S108.

At a step S109, the camera CPU 12 determines whether the half-depression of the release button has been canceled (OFF). If a result of the determination is no cancelation, the camera CPU 12 determines whether the release button has been fully depressed (2nd: ON) at a step S110. If a result of the determination is full depression of the release button, the camera CPU 12 executes image processing to the electrical signal ES output from the imaging element 11 to acquire image data of a still image as photographing processing, and stores the image data at a step S112.

On the other hand, if the camera CPU 12 has recognized at the step S106 that the moving image mode is being used, it determines whether a moving image recording button has been turned on at a step S114. If a result of the determination is the moving image recording button ON, the camera CPU 12 performs the AF processing to the subject at a step S115, performs the AE processing to the subject at a step S116, performs the image processing to the electrical signal ES output from the imaging element 11 to acquire image data of a moving image at a step S117, and stores the image data of the moving image at a step S118.

At a step S119, the camera CPU 12 determines whether the moving image recording button has been turned off and, if it has not been turned off, the processing returns to the step S115 to continue the moving image mode.

Figure 11A:
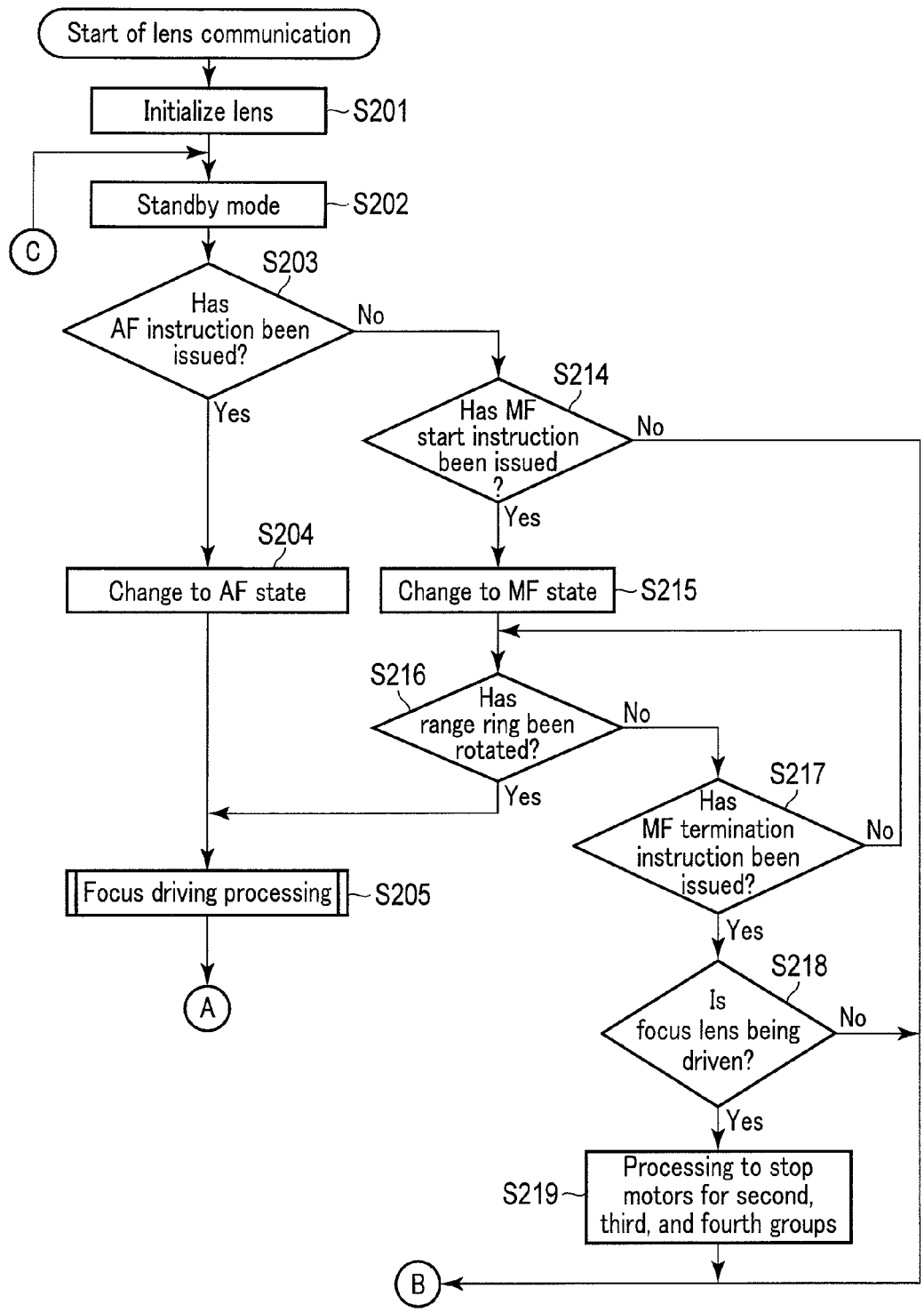
FIG. 11A is a flowchart of lens communication start in the device.
Figure 11B:
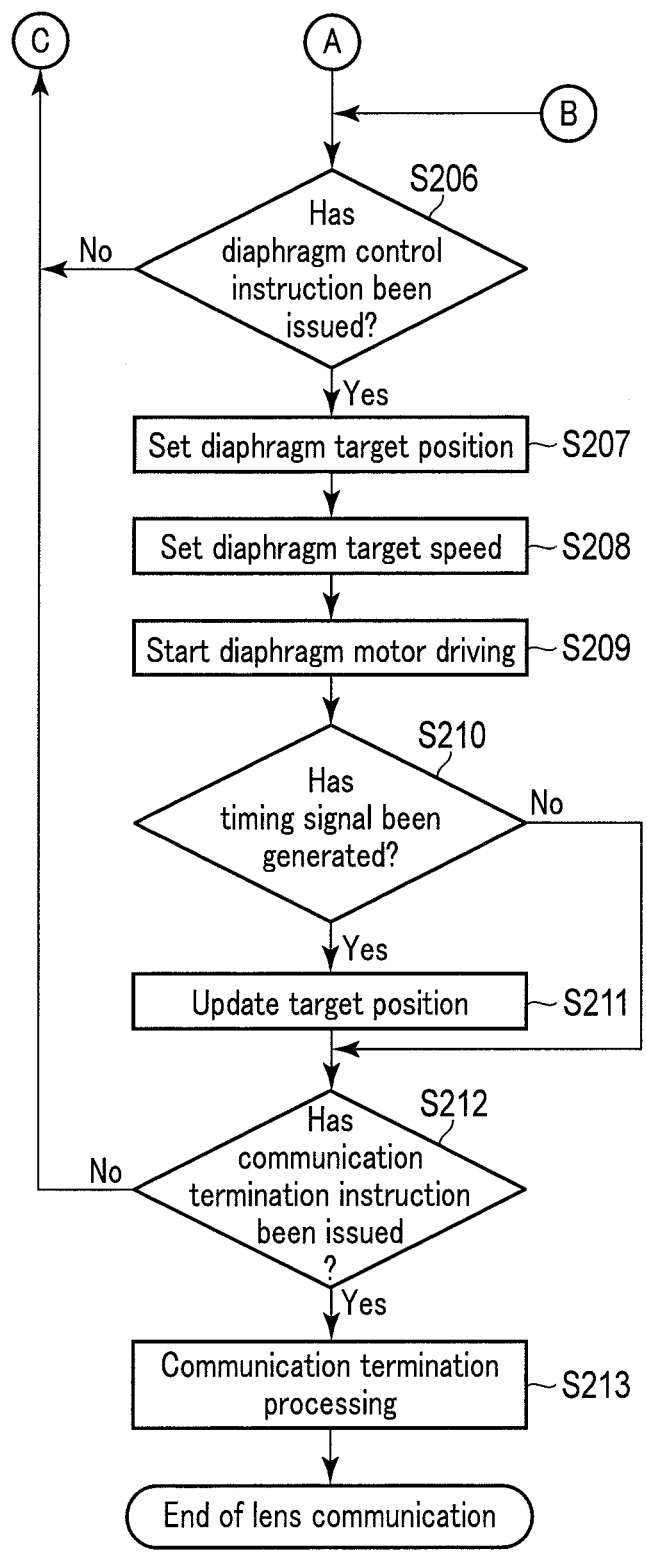
FIG. 11B is a flowchart of the lens communication start in the device.

Next, an operation of the lens CPU 130 at the start of lens communication (the step S102) in operations of the apparatus 200 will be described in accordance with flowcharts of lens communication start shown in FIG. 11A and FIG. 11B.

The lens CPU 130 initializes respective lens positions of the first to fifth lens groups 101 to 105 at a step S201, and enters a standby state at a step S202.

At a step S203, the lens CPU 130 determines whether an AF control instruction has been issued from the camera CPU 12. If a result of the determination shows that the AF control instruction has been issued, the focus control section 132 changes to an AF state at a step S204. At a step S205, the lens CPU 130 performs focus driving processing, namely, supplies focus control signals FS to effect the AF by use of the second to fourth lens groups 102 to 104, to the stepping motors 111 to 113 for the second to fourth groups through the drivers 122.

At a step S206, the lens CPU 130 determines whether there is a diaphragm control instruction to the diaphragm unit 120. If a result of the determination shows that there is the diaphragm control instruction, the diaphragm control section 134 sets a diaphragm target position of the diaphragm unit 120 at a step S207, and sets a diaphragm target speed of the diaphragm unit 120 at a step S208.

At a step S209, the lens CPU 130 supplies the diaphragm control signal WS to drive the diaphragm unit 120 in accordance with the diaphragm target position and the diaphragm target speed to the diaphragm stepping motor 121 through the driver 122, and starts driving the diaphragm stepping motor 121.

The timing signal generating section 133 generates the timing signal TS based on the focus control signal FS output from the focus control section 132.

At a step S210, the diaphragm control section 134 determines whether the timing signal TS has been generated by the timing signal generating section 133.

If a result of the determination shows that the timing signal TS has been generated, the diaphragm control section 134 updates the diaphragm target position at a step S211.

The diaphragm control section 134 reads out the focus/diaphragm relevant data stored in the focus/diaphragm memory unit 135 in accordance with the timing signal TS generated by the timing signal generating section 133, and supplies the diaphragm control signal WS based on the focus/diaphragm relevant data to the driver 122.

At a step S212, the lens CPU 130 determines whether an instruction to terminate the communication has been issued from the camera CPU 12 and, if the instruction has not been issued, the processing returns to the step S202 to repeat the steps S202 to 211.

If the instruction to terminate the communication has been issued from the camera CPU 12, the lens CPU 130 terminates the lens communication at a step S213.

On the other hand, at the step S203, if the AF control instruction has not been issued from the camera CPU 12, the lens CPU 130 determines whether there is an instruction to start manual focus (MF) at a step S214. If a result of the determination shows that there is the instruction to start the MF, the lens CPU 130 changes to an MF state at a step S215. On the other hand, if there is no instruction to start the MF, the lens CPU 130 advances the processing to a step S206. At a step S216 where the lens CPU 130 has changed to the MF state, whether a range ring (a focus ring) has been rotated is determined. As a result of the determination, if it is recognized that the focus ring has been rotated, the lens CPU 130 advances to the step S205 to perform the focus driving processing.

If it is not recognized that the focus ring has not been rotated, the lens CPU 130 determines whether there is an MF termination instruction at a step S217. If a result of the determination shows that there is the MF termination instruction, the lens CPU 130 determines whether the second to fourth lens groups 102 to 104 as focus lenses are reacting with the rotation of the focus ring and driving at a step S218. If a result of the determination shows that the second to fourth lens groups 102 to 104 are driving, the lens CPU 130 stops the driving of the stepping motors 111 to 113 for the second to fourth groups at a step S219. If the second to fourth lens groups 102 to 104 are not driving, the lens CPU 130 advances the processing to the step S206.

Next, an operation of the focus driving processing (the step S205) in operations of the apparatus 200 will be described in accordance with a focus processing flowchart shown in FIG. 12.

The focus control section 132 sets target positions of respective lens positions of the second to fourth lens groups 102 to 104 at a step S301, and sets driving speeds of the second to fourth lens groups 102 to 104 at a step S302. At a step S303, the focus control section 132 supplies the focus control signal FS to the stepping motors 111 to 113 for the second to fourth groups through the driver 122, and starts driving of the second to fourth lens groups 102 to 104.

At a step S304, the timing signal generating section 133 starts generation of the timing signal TS based on the focus control signal FS output from the focus control section 132.

At a step S305, the focus control section 132 determines whether the timing signal TS has been generated by the timing signal generating section 133. If a result of the determination shows that the timing signal has been generated, the focus control section 132 acquires a current position of the stepping motor 112 for the third group at a step S306.

At a step S307, the diaphragm control section 134 retrieves data corresponding to a diaphragm position (an aperture amount) of the diaphragm unit 120 corresponding to the current position of the stepping motor 112 for the third group from data stored in the focus/diaphragm memory section 135.

At a step S308, the diaphragm control section 134 compares a current diaphragm position of the diaphragm unit 120 with the diaphragm position of the diaphragm unit 120 retrieved from the focus/diaphragm memory section 135, and determines whether the current diaphragm position of the diaphragm unit 120 is different from the retrieved diaphragm position of the same.

If a result of the determination shows that these positions are different from each other, the diaphragm control section 134 supplies to the diaphragm stepping motor 121 through the driver 122 the diaphragm control signal WS to drive the diaphragm position of the diaphragm unit 120 to the diaphragm position retrieved from the focus/diaphragm memory section 135, and starts driving of the diaphragm stepping motor 121 at a step S309.

At a step S310, the focus control section 132 determines whether the stepping motors 111 to 113 for the second to fourth groups are driving. The focus control section 132 returns to the step S305 if a result of the determination shows that these stepping motors are driving, or the focus control section 132 terminates the focus driving processing at a step S311 if these stepping motors are not driving.

Next, an operation of the timing signal generation processing (the step S304) in operations of the apparatus will be described with reference to a timing signal generation flowchart shown in FIG. 13.

At a step S401, the timing signal generating section 133 reads out a focus control signal, which is supplied to the stepping motor 112 for the third group, from the focus control signals FS output from the focus control section 132, and counts a drive pulse number of this focus control signal.

At a step S402, the timing signal generating section 133 determines whether a count value of the drive pulse numbers has reached a preset count number. If a result of the determination shows that the count value of the drive pulse numbers has reached the present count value, the timing signal generating section 133 generates the timing signal TS at a step S403 and clears the count value of the drive pulse numbers at a step S404.

At a step S405, the timing signal generating section 133 determines whether the stepping motor 112 for the third group is driving, and it returns to the step S401 if this motor is driving.

Figure 14:
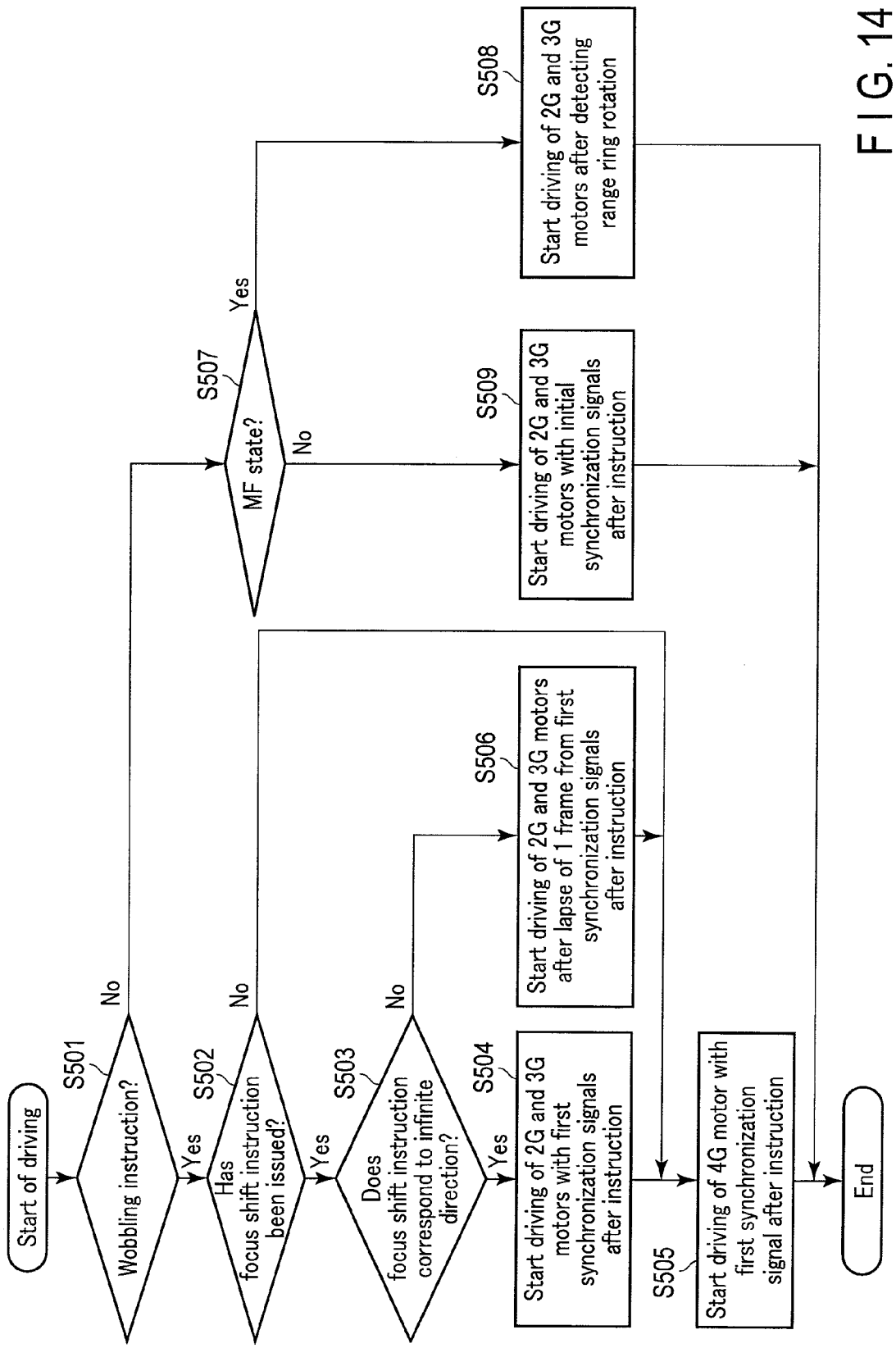
FIG. 14 is a flowchart of focus driving start in the device.

Subsequently, driving start processing (the step S303) of the second to fourth lens groups 102 to 104 in the focus driving processing (the step S205) in operations of the apparatus will be described with reference to a focus driving start flowchart shown in FIG. 14.

At a step S501, the focus control section 132 determines whether an instruction of the wobbling operation has been issued from the camera CPU 12. The focus control section 132 determines whether the instruction of the wobbling operation has been issued from a command of the wobbling operation including an amplitude and a moving amount of the wobbling operation issued from the camera CPU 12 at the AF.

If a result of the determination shows that the instruction of the wobbling operation has been issued, the focus control section 132 determines whether an instruction of focus shift, i.e., an instruction to move the second and third lens groups 101 and 102 has been issued from the camera CPU 12 at a step S502. If a result of the determination shows that the instruction of the focus shift has been issued, the focus control section 132 determines whether a direction of the focus shift is an infinite direction at a step S503.

If a result of the determination shows that the direction of the focus shift is the infinite direction, the focus control section 132 starts driving the second and third lens groups 102 and 103 with a first synchronization signal after the instruction at a step S504, and starts driving the stepping motor 113 for the fourth group with the first synchronization signal after the instruction at a step S505.

If a result of determining whether the instruction of the focus shift has been issued from the camera CPU 12 (the step S502) is no instruction of the focus shift, the focus control section 132 proceeds to the step S505.

If a result of determining whether the direction of the focus shift is the infinite direction (the step S503) is not the infinite direction, the focus control section 132 starts driving the second and third stepping motors 111 and 112 in accordance with a synchronization signal provided after an elapse of one frame from the first synchronization signal after the instruction, respectively, at a step S506.

On the other hand, if a result of determining whether the instruction of the wobbling operation has been issued (the step S501) shows that the instruction of the wobbling operation has not been issued, the focus control section 132 determines whether the MF state has been realized at a step S507. If a result of the determination is the MF state, the focus control section 132 starts driving the stepping motors 111 and 112 for the second and third groups after detecting the rotation of the focus ring at a step S508.

If the MF state has not been realized, the focus control section 132 starts driving the stepping motors 111 and 112 for the second and third groups with a first synchronization signal after the instruction, respectively, at a step S509.

In such a wobbling operation, when the amplitude and the moving amounts of the wobbling operation are indicated from the camera CPU 12, the focus control section 132 moves the second and third lens groups 102 and 103 by the indicated moving amounts to move image surface positions of the lens groups 101 to 104 by predetermined amounts while effecting the wobbling operation of the fourth lens group 104 for one period alone.

Figure 15:
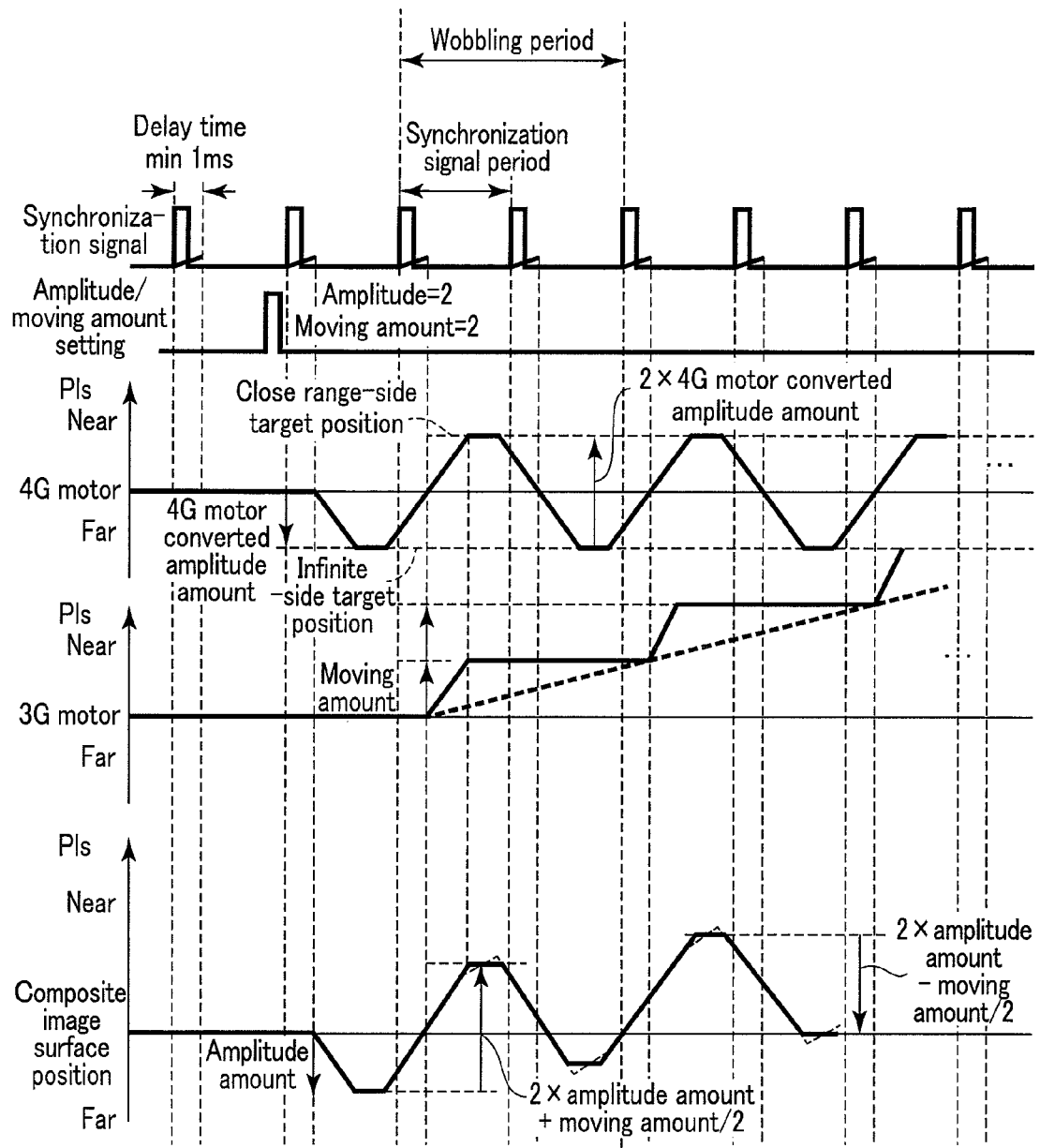
FIG. 15 is a timing chart showing a wobbling operation in the device.

FIG. 15 shows a timing chart of the wobbling operation. This Figure shows synchronization signals from the camera CPU 12, indication of an amplitude and moving amounts in the wobbling operation, the wobbling operations of the fourth lens group 104, moving operations of the second lens group 102 and the third lens group 103, and changes in a composite image surface position.

A wobbling period is set to be double a period of the synchronization signals from the camera CPU 12.

The wobbling operation of the fourth lens group 104 starts when a predetermined delay time passes from a rise of the synchronization signal. In the wobbling operation of the fourth lens group 104, a close range-side target position and an infinite-side target position are set, with which movements toward the close range side and the infinite side from a center (reference) positon of the wobbling are carried out by an amplitude amount, respectively.

As to the moving amounts of the second and third lens groups 102 and 103, the second and the third lens groups 102 and 103 are moved by the moving amounts indicated by the camera CPU 12 every time the wobbling operation of the fourth lens group 104 is performed for one period. The moving operations of the second and third lens groups 102 and 103 are carried out before the fourth lens group 104 reaches the close range-side target position.

The second and third lens groups 102 and 103 are stopped while the second focus lens group 104 stops at the close range-side target position for a predetermined time alone, then moves to the infinite-side target position, and stops at the infinite-side target position for a predetermined time.

As described above, within one period of the wobbling operation, when the fourth lens group 104 is placed at least at the close range-side target position and the infinite-side target position, the second and third lens groups 102 and 103 are maintained at the same positions, respectively. The close range-side target position and the infinite-side target position at this moment enable the wobbling operation based on the same image surface position. As described above, a timing for moving the second and third lens groups 102 and 103 is determined as a period by excluding a period during which the fourth lens group 104 is placed at the close range-side target position and the infinite-side target position in one period of the wobbling operation.

Therefore, in the wobbling operation, the amplitude of the wobbling operation of the forth lens group 104 is combined with the moving amounts of the second and third lens groups 102 and 103 to cause, e.g., a composite image surface position to move toward the close range direction. If the camera CPU 12 has detected that the subject moves in the close range direction, the processing shown in FIG. 15 is applied, thereby following the subject to effect focusing.

In such a wobbling operation, miniaturization is possible, and following performance of the AF to, e.g., a moving subject can be improved.

In the wobbling operation, although the fourth lens group 104 moves to the infinite-side target position and the close range side target position in the mentioned order, a reverse order may be adopted. Although the example that the second and third lens groups 102 and 103 move to the close range-side has been provided, a case that the lens groups move to the infinite side is the same except the moving direction is different.

Subsequently, another wobbling operation will be described.

Figure 16:
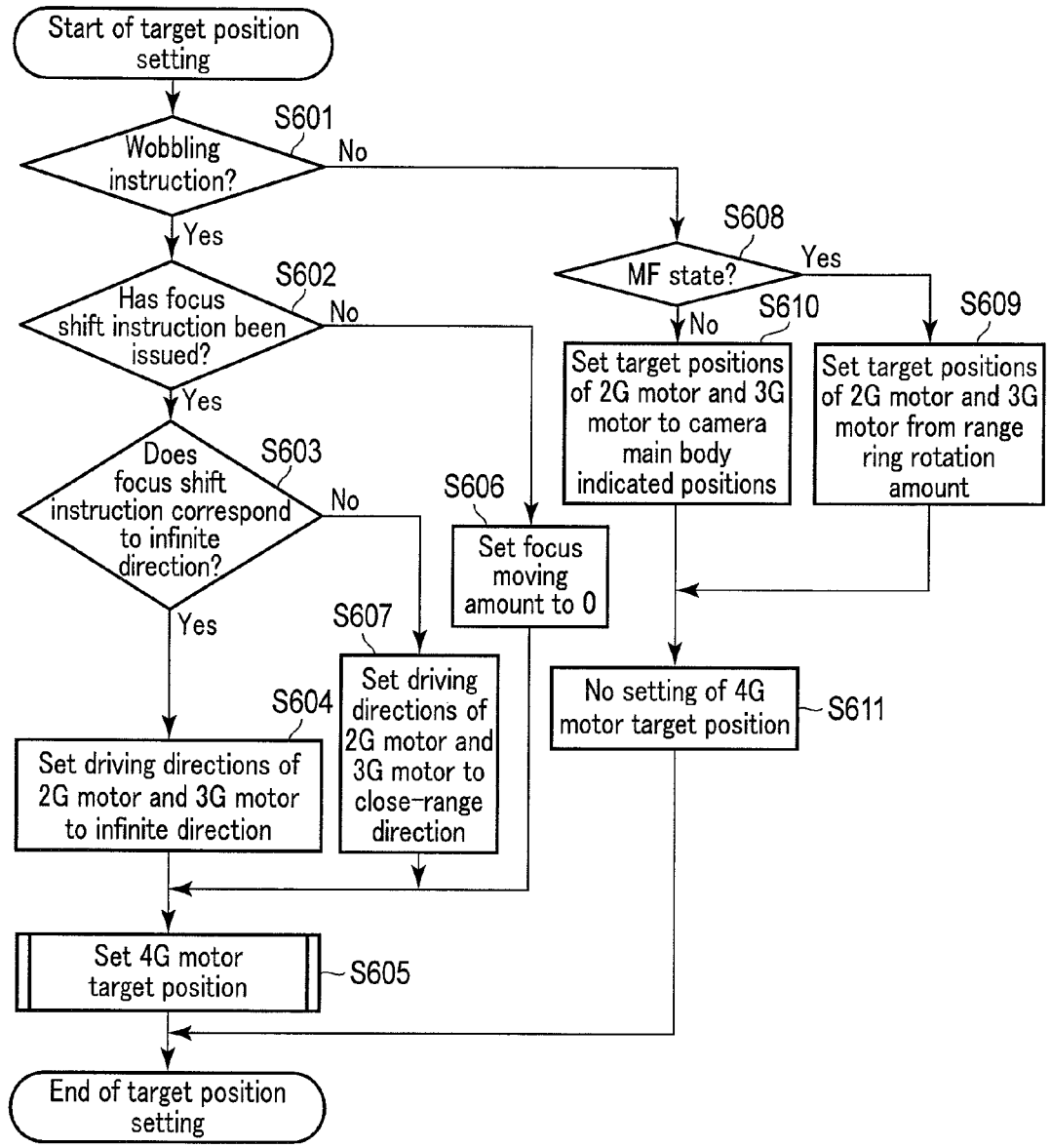
FIG. 16 is a flowchart of target position setting start in the device.

Prior to explaining the wobbling operation, first, an operation of processing to start the target position setting (the step S301) in operations of the apparatus 200 will be described with reference to a target position setting start flowchart shown in FIG. 16.

At a step S601, the focus control section 132 determines whether an instruction of the wobbling operation has been issued from the camera CPU 12. The focus control section 132 determines whether a command of the wobbling operation including an amplitude and moving amounts of the wobbling operations issued from the camera CPU 12 has been received at the AF, thereby determining whether the instruction of the wobbling operation has been issued.

If a result of the determination shows that the instruction of the wobbling operation has been issued, the focus control section 132 determines whether an instruction of focus shift, i.e., an instruction to move the second and third lens groups 102 and 103 has been issued from the camera CPU 12 at a step S602. If a result of the determination shows that the instruction of the focus shift has been issued, the focus control section 132 determines whether a direction of the focus shift is the infinite direction at a step S603.

If a result of the determination shows that the direction of the focus shift is the infinite direction, the focus control section 132 sets driving directions of the stepping motors 111 and 112 for the second and third groups that drive the second and third lens groups 102 and 103 to the infinite direction respectively at a step S604, and sets a target position of the stepping motor 113 for the fourth group at a step S605.

If a result of determining whether the instruction of the focus shift has been issued from the camera CPU 12 (the step S602) is no instruction of the focus shift, the focus control section 132 sets focus shift amounts, i.e., moving amounts of the stepping motors 111 and 112 for the second and third groups to "0" at a step S606.

If a result of determining whether the direction of the focus shift is the infinite direction (the step S603) is not the infinite direction, the focus control section 132 sets the driving directions of the stepping motors 111 and 112 for the second and third groups to be close to each other at a step S607.

On the other hand, if a result of determining whether the instruction of the wobbling operation has been issued (the step S601) is no instruction of the wobbling operation, the focus control section 132 determines whether an instruction of the MF has been issued at a step S608. If a result of the determining shows that the MF instruction has been issued, the focus control section 132 sets target positions of the stepping motors 111 and 112 for the second and third groups based on a rotation amount of the focus ring at a step S609.

If the MF instruction has not been issued, the focus control section 132 sets the target positions of the stepping motors 111 and 112 for the second and third groups to indicated positions from the camera CPU 12.

At a step S611, the focus control section 132 does not set a target position of the stepping motor 113 for the fourth group.

Figure 17:
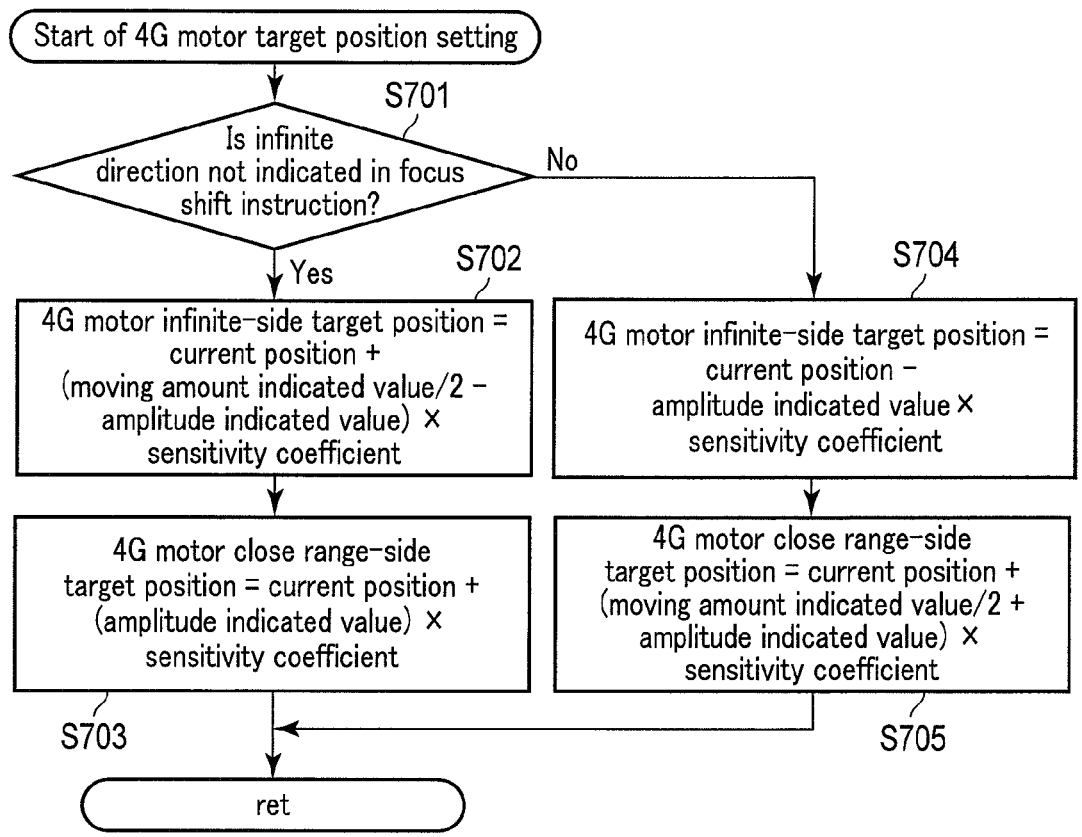
FIG. 17 is a flowchart of target position setting start of a stepping motor for a fourth group in the device.

Subsequently, an operation of setting the target position of the fourth stepping motor 113 (the step S605) in operations of the apparatus 200 will be described with reference to a target position setting start flowchart of the stepping motor 113 for the fourth group shown in FIG. 17.

At a step S701, the focus control section 132 determines whether the instruction of the focus shift from the camera CPU 12 corresponds to the infinite direction or no instruction.

If a result of the determination shows that the instruction of the focus shift corresponds to the infinite direction or no instruction, the focus control section 132 sets an infinite-side target position (the following Expression (1)) of the stepping motor 113 for the fourth group at a step S702. At a step S703, the focus control section 132 sets a close range-side target position (the following Expression (2)) of the stepping motor 113 for the fourth group.

The infinite-side target position of the stepping motor 113 for the fourth group=a current position of the stepping motor 113 for the fourth group+(a moving amount indicated value/2−an amplitude indicated value)×a sensitivity coefficient (1)

The close range-side target value of the stepping motor 113 for the fourth group=a current position of the stepping motor 113 for the fourth group+(an amplitude indicated value)×the sensitivity coefficient (2)

The sensitivity coefficient is a coefficient that is used to convert a moving amount of the stepping motor 112 for the third group into a moving amount of the stepping motor 113 for the fourth group.

The moving amount indicated value/2 represents half of the moving amount of the stepping motor lens 112 for the third group in one period of the wobbling operation. The moving amount indicated value/2 corresponds to a numerical value obtained by adding an offset value (¼ of the moving amount) and an amplitude addition value (¼ of the moving amount). As a specific method for correcting the wobbling operation, the target position is set by Expression (2).

On the other hand, if the instruction is not the instruction of the focus shift corresponds to the infinite direction or no instruction, the focus control section 132 sets an infinite-side target position of the stepping motor 113 for the fourth group (the following Expression (3)) at a step S704, and sets a close range-side target position of the stepping motor 113 for the fourth group (the following Expression (4)) at a step S705.

The infinite-side target position of the stepping motor 113 for the fourth group=a current position of the stepping motor 113 for the fourth group−an amplitude indicated value×a sensitivity coefficient (3)

The close range-side target position of the stepping motor for the fourth group=a current position of the stepping motor 113 for the fourth group+(a moving amount indicated value/2+the amplitude indicated value)×the sensitivity coefficient (4)

The moving amount indicated value/2 represents half of a moving amount of the stepping motor 112 for the third group in one period of the wobbling. The moving amount indicated value/2 corresponds to a numerical value obtained by adding an offset value (¼ of the moving amount) and an amplitude addition value (¼ of the moving amount). As a specific method for correcting the wobbling operation, the target position is set by Expression (4).

Figure 18:
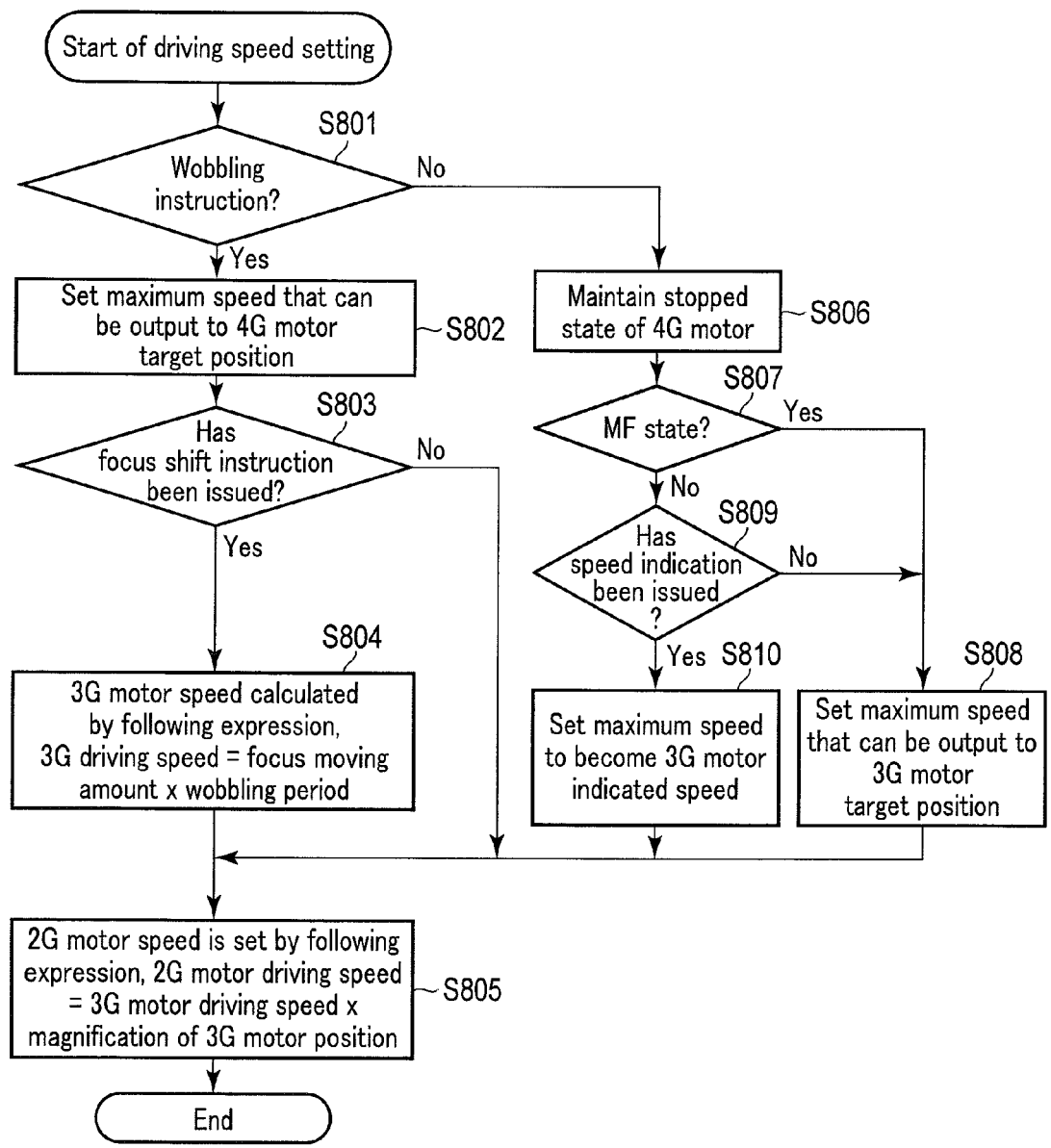
FIG. 18 is a flowchart of driving speed setting start in the device.

Subsequently, an operation of setting driving speeds of the stepping motors 111 to 113 for the second to fourth groups (the step S302) in operations of the apparatus 200 will be described with reference to a driving speed setting start flowchart shown in FIG. 18.

At a step S801, the focus control section 132 determines whether an instruction of the wobbling operation has been issued from the camera CPU 12. If a result of the determination shows that the instruction of the wobbling operation has been issued, the focus control section 132 sets a maximum speed that can be output to the target position of the stepping motor 113 for the fourth group at a step S802.

At a step S803, the focus control section 132 determines whether an instruction of focus shift has been issued. If a result of the determination shows that the instruction of the focus shift has been issued, the focus control section 132 calculates a driving speed of the stepping motor 112 for the third group from the following Expression (5) at a step S804.

The driving speed=a focus shift amount×the wobbling period (5)

At a step S805, the focus control section 132 calculates a speed of the stepping motor 111 for the second group from the following Expression (6).

The speed of the stepping motor 111 for the second group=the driving speed of the stepping motor 112 for the third group×a magnification for each position of the stepping motor 112 for the third group (6)

On the other hand, if the instruction of the wobbling operation has not been issued from the camera CPU 12, the focus control section 132 maintains a stopped state of the stepping motor 113 for the fourth group at a step S806, and determines whether the MF state has been realized at a step S807.

If a result of the determination is the MF state, the focus control section 132 sets a maximum speed that can be output to the target position of the stepping motor 112 for the third group at a step S808.

If no MF state has been realized, the focus control section 132 determines whether a speed has been indicated at a step S809. If a result of the determination shows that the speed has been indicated, the focus control section 132 sets a maximum speed to become an indicated speed of the stepping motor 112 for the third group at a step S810. If no speed has been indicated, the focus control section 132 shifts to the step S808.

In such a wobbling operation, at the time of moving the second and third lens groups 102 and 103, a center position of the amplitude of the wobbling operation of the fourth lens group 104 is offset by an offset value, which is ¼ of the moving amount of the wobbling operation, in moving directions of the second and third lens groups 102 and 103, and ¼ of the moving amount of the wobbling operation is added to the amplitude of the wobbling operation, thereby effecting the wobbling operation. The second and third lens groups 102 and 103 move in indicated directions at predetermined constant speeds during the wobbling operation.

Figure 19:
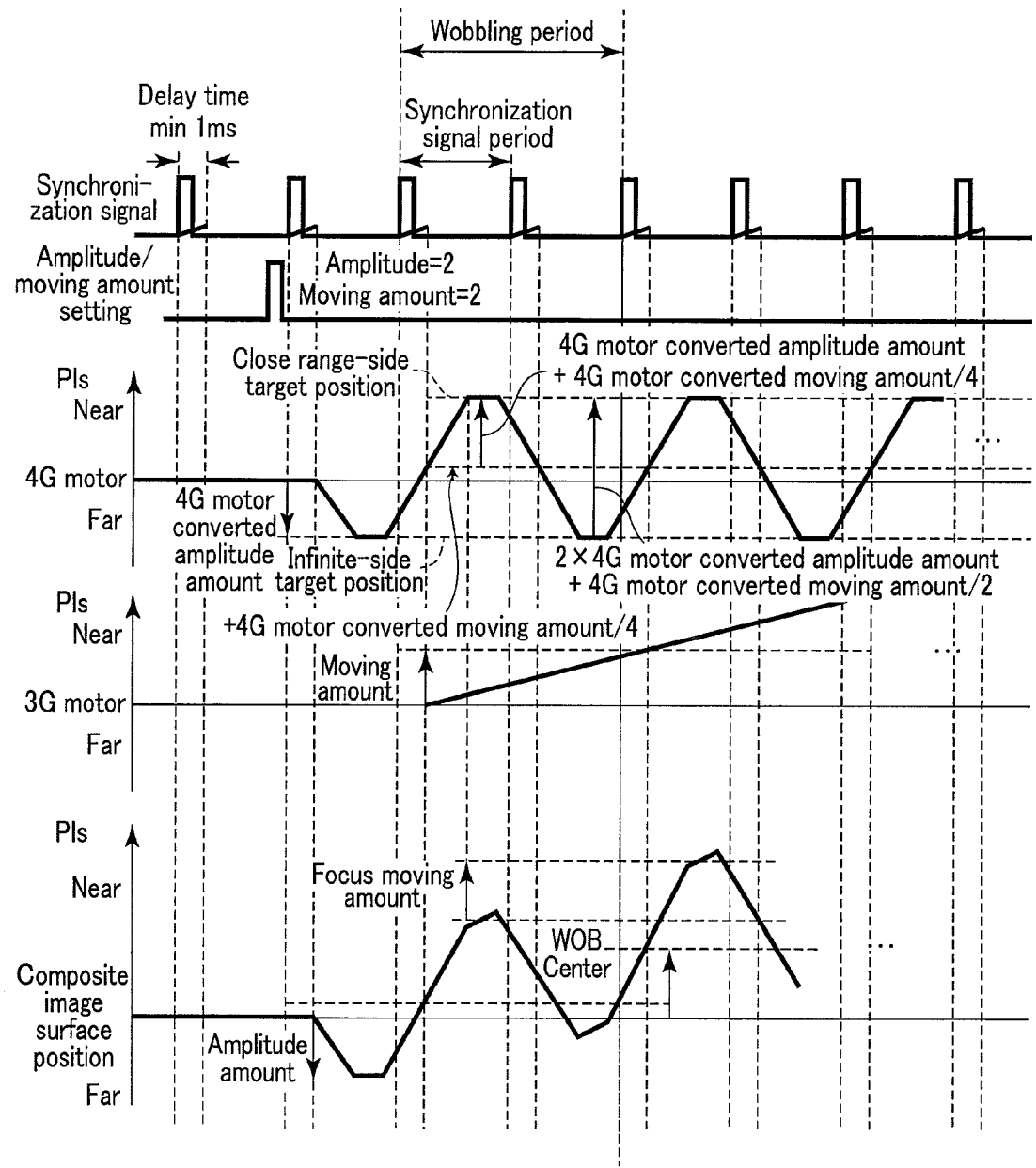
FIG. 19 is a timing chart showing the wobbling operation in the device.

FIG. 19 shows a timing chart of the wobbling operation. Like FIG. 15, this view shows synchronization signals from the camera CPU 12, indication of an amplitude and moving amounts of the wobbling operation, the wobbling operation of the fourth lens group 104, moving operations of the second lens group 102 and the third lens group 103, and movement of a composite image surface position. A wobbling period is set to be double a period of the synchronization signals.

The wobbling operation of the fourth lens group 104 starts when a predetermined delay time passes from a rise of the synchronization signal. In the wobbling operation of the fourth lens group 104, a close range-side target position and an infinite-side target position are set.

As to the wobbling operation of the fourth lens group 104, a center position of an amplitude of the wobbling operation is offset by an offset value, which is ¼ of a moving amount of the wobbling operation, in moving directions of the second and third lens groups 102 and 103, and ¼ of the moving amount of the wobbling operation (an amplitude addition value) is added to the amplitude of the wobbling operation, thereby effecting the wobbling operation.

In the wobbling operation, the second and third lens groups 102 and 103 are moved at constant speeds concurrently with the wobbling operation so that image surface positions move by predetermined moving amounts during one period of the wobbling operation.

Therefore, based on the wobbling operation described above, the amplitude of the wobbling operation of the fourth lens group 104 is combined with the moving amounts provided by the movements of the second and third lens groups 102 and 103 at the constant speeds, thereby causing, e.g., a composite image surface position to micro-vibrate while moving in the close range direction.

At the end of wobbling driving, the fourth lens group drives to an initial position. If movement of a subject in the close range direction has been detected, the camera CPU 12 can apply processing shown in FIG. 19 and effect focusing while following the subject.

If the above-described wobbling operation is performed, miniaturization is possible, and following performance of the AF to a moving subject can be improved.

In the wobbling operation according to this embodiment, noise can be reduced at the time of driving of the second and third lens groups 102 and 103 that move the focus positions. The moving amounts are controlled at constant speeds so that driving can be performed by indicated moving amounts, after the lapse of two frames at which a reciprocating operation of the amplitude of the wobbling operation is completed, so that starts and stops of the driving of the second and third lens groups 102 and 103 are reduced as much as possible. The generation of driving sounds due to the driving start (activation) and stop operations of the second and third lens groups 102 and 103 can be prevented, and hence the noise reduction can be achieved.

On the other hand, if the moving amount of the wobbling operation is set, the lens group whose moving amount is to be controlled is positioned based on a speed. Hence an image surface change in one frame in which the reciprocation of the wobbling operation is performed is insufficient as much as a half of the moving amount. But an offset value corresponding to ¼ of the moving amount of the wobbling operation is only offset, and an amplitude to which an amplitude addition value corresponding to ¼ of the moving amount is added is achieved. The insufficiency of the moving amount of ½ of the image surface change in the one frame can be complemented.

It is to be noted that, in this embodiment, the offset value of the wobbling operation is set to ¼ of the moving amount and the amplitude addition value is set to ¼ of the moving amount, but the set values of the offset value and the amplitude addition value are not restricted thereto. If ½ of the moving amount is distributed to the offset value and the moving amount, the same effect can be provided. For example, the offset value may be set to 3/10 of the moving amount while the amplitude addition value may be set to ⅕ of the moving amount, or the offset value may be set to ⅛ of the moving amount while the amplitude addition value may be set to ⅜ of the moving amount, and both cases result in the same effect. Further, the offset value may be set to ⅓ of the moving amount while the amplitude addition value may be set to ⅙ of the moving amount, which likewise results in the same effect.

In the wobbling operation, when the amplitude and the moving amount of the wobbling operation at the AF are rapidly and continuously changed and the moving amount is continuously changed in the same direction as the currently set moving amount from the camera main body 10, the moving amount is also continuously changed. When the moving amount in the opposite direction is indicated, after the indication, control of the moving amount in the opposite direction is started after the lapse of one frame from stoppage after a first delay amount has passed. As a result, noise can be reduced, and step-out of the motors can be avoided.

In the prior art, since a reciprocating operation corresponding to an amplitude of the wobbling operation and shift of a focus position are carried out in an interchangeable lens having one focus lens group alone, driving availability is limited due to dependence on a performance of a motor that drives the focus lens group but, in the apparatus 200, the fourth lens group 104 that effects the wobbling operation is separated from the second and third lens groups 102 and 103 that move focus positions, and these lens groups can move (drive) at the same time, thus increasing the amplitude of the wobbling operation and the focus shift amounts as compared with a prior art apparatus.

Additional advantages and modifications will readily occur to those skilled in the art. Therefore, the invention in its broader aspects is not limited to the specific details and representative embodiments shown and described herein. Accordingly, various modifications may be made without departing from the spirit or scope of the general inventive concept as defined by the appended claims and their equivalents.

What is claimed is:

1. A focusing device comprising:
   an imaging element which includes an imaging plane;
   an imaging lens which includes focus lens groups, which includes first and second focus lens groups, and forms an image of a subject on the imaging plane of the imaging element to enable focus adjustment;
   a focus evaluation value detecting section which detects a focus evaluation value based on an image signal acquired by imaging of the imaging element; and a control section which moves the focus lens groups based on the focus evaluation value, effects a wobbling operation of the first focus lens group to focus on the subject, and moves the second focus lens group while effecting the wobbling operation of the first lens group for one period alone so that image surface positions of the focus lens groups are moved by predetermined amounts, wherein the control section offsets a center position of an amplitude of the wobbling operation of the first focus lens group by a first amount in a moving direction of the second focus lens group and adds a second amount to the amplitude of the wobbling operation thereby increasing the amplitude of the wobbling operation in both a moving direction of the second focus lens group and against the moving direction of the second focus lens group while moving the second focus lens group.

2. The device according to claim 1,
wherein an image surface sensitivity of the second focus lens group is higher than an image surface sensitivity of the first focus lens group.

3. The device according to claim 1,
wherein the first amount is ¼ of a moving amount to move the second focus lens group while the control section allows the first focus lens group to effect the wobbling operation for one period alone, and
the second amount is ¼ of the moving amount.

4. The device according to claim 3,
wherein, if the amplitude and the moving amount of the wobbling operation are indicated, the control section obtains the first mount that is ¼ of the moving amount, and obtains the second amount that is ¼ of the moving amount.

5. The device according to claim 1,
wherein the control section drives the second focus lens group at a constant speed.

6. The device according to claim 1,
wherein the control section moves the first focus lens group between a close range-side target position and an infinite-side target position, which are determined based on the center position of the amplitude and an amount of the amplitude of the wobbling operation, to effect the wobbling operation, and upon indication of the amplitude of the wobbling operation and a moving amount to move the second focus lens group, the control section moves the second focus lens group by the indicated moving amount during a period excluding a period in which the first focus lens is placed at the close range-side target value and the infinite-side target position while effecting the wobbling operation of the first focus lens group for one period alone.

7. The device according to claim 1, further comprising:
a memory section which stores the amplitude of the wobbling operation and a moving amount to move the second focus lens group while the first lens group effects the wobbling operation for one period alone,
wherein the control section obtains the first amount and the second amount based on the amplitude and the moving amount output from the memory section.

8. A camera system comprising:
an interchangeable lens including a photographing lens comprising focus lens groups including first and second lens groups; and a camera main body to and from which the interchangeable lens is attachable and detachable, respectively, and which includes an imaging element,
wherein the camera main body includes: a focus evaluation value detecting section which detects a focus evaluation value based on an image signal obtained by imaging of the imaging element; and
a main body control section which communicates with the interchangeable lens and instructs on a focusing operation to focus on the subject based on the focus evaluation value,
the interchangeable lens includes: a focus lens driving section which separately drives the focus lens groups; and
a lens control section which communicates with the main body control section to move the focus lens groups, and controls the focus lens driving section to effect a wobbling operation of the first focus lens group, and
the lens control section moves the second focus lens group to move image surface positions of the focus lens groups by predetermined amounts while effecting the wobbling operation of the first lens group for one period alone, and offsets a center position of an amplitude of the wobbling operation of the first focus lens group by a first amount in a moving direction of the second focus lens group and adds a second amount to the amplitude of the wobbling operation thereby increasing the amplitude of the wobbling operation in both a moving direction of the second focus lens group and against the moving direction of the second focus lens group while moving the second focus lens group.

9. The system according to claim 8,
wherein an image surface sensitivity of the second focus lens group is higher than an image surface sensitivity of the first focus lens group.

10. The system according to claim 8,
wherein the first amount is ¼ of a moving amount to move the second focus lens group while the lens control section allows the first focus lens group to effect the wobbling operation for one period alone, and
the second amount is ¼ of the moving amount.

11. The system according to claim 10,
wherein the main body control section instructs the lens control section to perform a focusing operation and also indicates the amplitude and the moving amount of the wobbling operation, and
the lens control section obtains the first amount that is ¼ of the moving amount and obtains the second amount that is ¼ of the moving amount if the amplitude and the moving amount of the wobbling operation are indicated.

12. The system according to claim 8,
wherein the lens control section drives the second focus lens group at a constant speed.

13. The system according to claim 8,
wherein the main body control section instructs the lens control section to perform the focusing operation and indicates the amplitude of the wobbling operation and a moving amount to move the second focus lens group, and
upon indication of the amplitude of the wobbling operation and the moving amount to move the second focus lens group, the lens control section moves the second focus lens group by the indicated moving amount during a period excluding a period that the first focus lens is placed at a close range-side target position and an infinite-side target position, which are determined based on the center position of the amplitude of the wobbling operation and an amount of the amplitude, while effecting the wobbling operation of the first focus lens group for one period alone.

14. The system according to claim 8,
wherein the main body control section indicates the lens control section the amplitude of the wobbling operation and a moving amount to move the second focus lens group while the first focus lens group effects the wobbling operation for one period alone, and
the lens control section obtains the first amount and the second amount based on the amplitude of the wobbling operation and the moving amount.

15. A focusing method comprising:
forming an image of a subject on an imaging plane of an imaging element through focus lens groups including first and second focus lens groups;
detecting a focus evaluation value based on an image signal acquired by imaging of the imaging element;
moving the focus lens groups based on the focus evaluation value, and effecting a wobbling operation of the first focus lens group to focus on the subject;
moving the second focus lens group while effecting the wobbling operation of the first focus lens group for one period only, so that image surface positions of the focus lens groups are moved by predetermined amounts;
offsetting a center position of an amplitude of the wobbling operation of the first focus lens by a first amount in a moving direction of the second focus lens group while moving the second focus lens group; and
adding a second amount to the amplitude of the wobbling operation thereby increasing the amplitude of the wobbling operation in both a moving direction of the second focus lens group and against the moving direction of the second focus lens group.

16. The method according to claim 15,
wherein the first amount is ¼ of a moving amount to move the second focus lens group while the first focus lens group effects the wobbling operation for one period alone, and
the second amount is ¼ of the moving amount.

17. The method according to claim 15,
wherein the second focus lens group is driven at a constant speed.

18. The method according to claim 15,
wherein the first amount and the second amount are obtained in accordance with the amplitude of the wobbling operation and a moving amount to move the second focus lens group while the first focus lens group effects the wobbling operation for one period alone, which are stored in advance.

* * * * *